United States Patent
Yoon et al.

(10) Patent No.: US 10,734,855 B2
(45) Date of Patent: Aug. 4, 2020

(54) ROTOR AND METHOD OF MANUFACTURING SAME

(71) Applicant: Samsung Electronics Co., Ltd, Gyeonggi-do (KR)

(72) Inventors: Keun Young Yoon, Gyeonggi-do (KR); Young Kwan Kim, Gyeonggi-do (KR); Woon Yong Lee, Gyeonggi-do (KR); Su Kwon Jeong, Gyeonggi-do (KR); Jae Woong Jung, Seoul (KR); Woong Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 711 days.

(21) Appl. No.: 14/905,767

(22) PCT Filed: Jul. 15, 2014

(86) PCT No.: PCT/KR2014/006394
§ 371 (c)(1),
(2) Date: Jan. 15, 2016

(87) PCT Pub. No.: WO2015/009031
PCT Pub. Date: Jan. 22, 2015

(65) Prior Publication Data
US 2016/0156233 A1    Jun. 2, 2016

(30) Foreign Application Priority Data

Jul. 16, 2013 (KR) .................. 10-2013-0083450
Jul. 14, 2014 (KR) .................. 10-2014-0088546

(51) Int. Cl.
*H02K 21/12* (2006.01)
*H02K 1/27* (2006.01)

(52) U.S. Cl.
CPC ................ *H02K 1/2786* (2013.01)

(58) Field of Classification Search
CPC ............................................. H02K 1/278
(Continued)

(56) References Cited

U.S. PATENT DOCUMENTS 8,354,766 B2 * 1/2013 Maekawa ............ D06F 37/206
 310/156.43
9,136,736 B2 * 9/2015 Hoemann ............ H02K 1/2786
(Continued)

FOREIGN PATENT DOCUMENTS

CN   101282068 A   10/2008
CN   102738924 A   10/2012
(Continued)

OTHER PUBLICATIONS

Communication from a foreign patent office in a counterpart foreign application, "The First Office Action," Chinese Application No. 2014800439835, dated Nov. 3, 2017, 16 pages.
(Continued)

Primary Examiner — Alexander Talpalatski

(57) ABSTRACT

Disclosed herein are a rotor and a method of manufacturing the rotor. The rotor includes a rotor assembly including magnets and rotor cores, and a molding unit including a first molding unit disposed by being firstly injection molded to support the rotor assembly before the magnets are magnetized and a second molding unit disposed by being secondly injection molded to support the rotor assembly after the magnets are magnetized.

20 Claims, 45 Drawing Sheets

(58) Field of Classification Search
USPC .................................................. 310/156.01
See application file for complete search history.

(56) References Cited

U.S. PATENT DOCUMENTS

| | | | | |
|---|---|---|---|---|
| 9,667,111 | B2* | 5/2017 | Kim ..................... | H02K 1/2766 |
| 2005/0071985 | A1 | 4/2005 | Won et al. | |
| 2009/0174273 | A1* | 7/2009 | Watanabe .............. | H02K 15/03 |
| | | | | 310/156.53 |
| 2010/0038985 | A1* | 2/2010 | Shim ..................... | H02K 15/03 |
| | | | | 310/156.43 |
| 2012/0043844 | A1* | 2/2012 | Bailey ................... | D06F 37/304 |
| | | | | 310/156.12 |
| 2013/0328432 | A1* | 12/2013 | Hoemann ............ | H02K 1/2786 |
| | | | | 310/156.12 |
| 2014/0084731 | A1* | 3/2014 | Iwami ................... | D06F 37/206 |
| | | | | 310/156.07 |

FOREIGN PATENT DOCUMENTS

| | | |
|---|---|---|
| JP | 11-289722 | 10/1999 |
| JP | 2008-125353 | 5/2008 |
| JP | 2009-124007 | 6/2009 |
| JP | 2010-004661 | 1/2010 |
| KR | 10-0631533 B1 | 10/2006 |

OTHER PUBLICATIONS

International Search Report dated Oct. 8, 2014 in connection with International Application No. PCT/KR2014/006394, 5 pages.
Written Opinion of the International Searching Authority dated Oct. 8, 2014 in connection with International Application No. PCT/KR2014/006394, 4 pages.

* cited by examiner

200a

200b

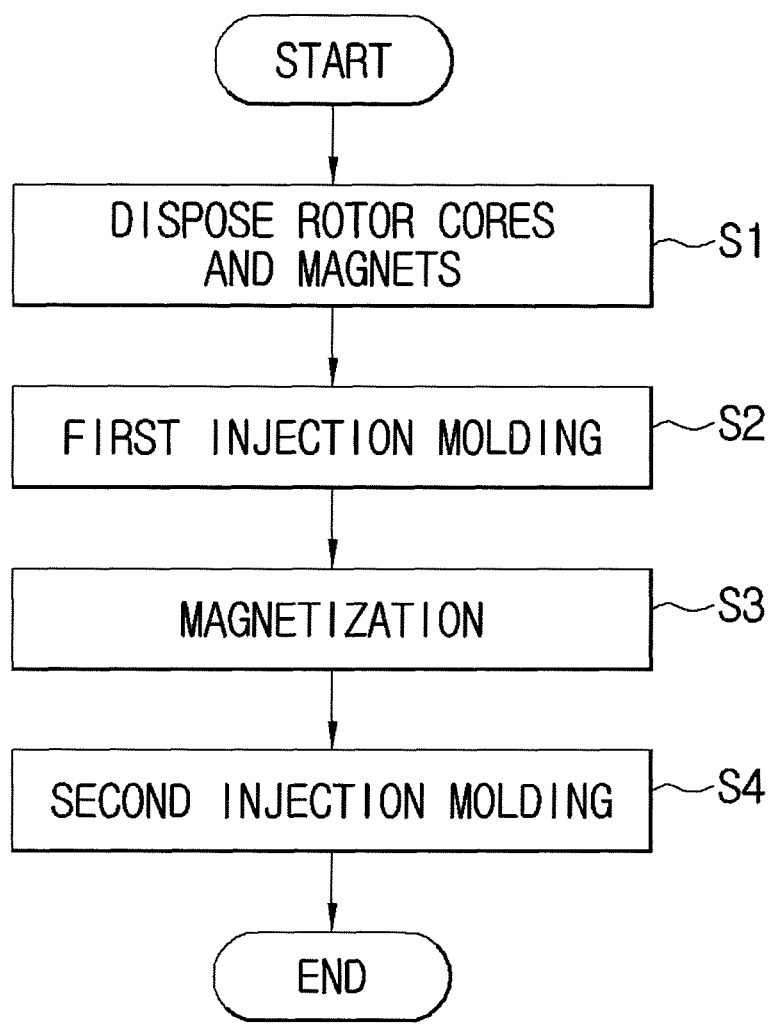

ROTOR AND METHOD OF MANUFACTURING SAME

CROSS-REFERENCE TO RELATED APPLICATION(S)

The present application claims priority under 35 U.S.C. § 365 to International Patent Application No. PCT/KR2014/006394 filed Jul. 15, 2014, entitled "ROTOR AND METHOD OF MANUFACTURING SAME", and, through International Patent Application No. PCT/KR2014/006394, to Korean Patent Application No. 10-2013-0083450 filed Jul. 16, 2013 and Korean Patent Application No. 10-2014-0088546 filed Jul. 14, 2014, each of which are incorporated herein by reference into the present disclosure as if fully set forth herein.

TECHNICAL FIELD

The present invention relates to a rotor manufactured by dual injection molding to facilitate magnetization and a method of manufacturing the same.

BACKGROUND ART

A motor is an apparatus which obtains a rotary force from electrical energy, and includes a stator and a rotor. The rotor is configured to electromagnetically interact with the stator, and rotates by a force acting between a magnetic field and current flowing in a coil.

Permanent magnet motors which use a permanent magnet to generate a magnetic field may be classified as a surface mounted permanent magnet motor, an interior type permanent magnet motor, and a spoke type permanent magnet motor.

Among these, the spoke type permanent magnet motor may generate high torque and high output due to structurally high magnetic flux density, and is able to miniaturize a motor with respect to the same output. The spoke type permanent magnet motor may be applied to a driving motor of a washing machine, a driving motor of an electric vehicle, and a driving motor of a small generator, which require high torque and high output characteristics.

In general, a rotor of the spoke type permanent magnet motor includes a plurality of permanent magnets radially disposed about a rotation axis, a plurality of rotor cores disposed between each of the permanent magnets, and a molding unit which supports the plurality of rotor cores and the plurality of magnets.

In a conventional case, to prevent a defect from occurring during injection molding due to magnetism of the magnets, the plurality of magnets in an unmagnetized state were accommodated in a mold while being alternately disposed with the plurality of rotor cores and were injection molded with a resin. The magnets were magnetized after being injection molded. In this case, since a magnetizer and the magnets may be spaced as much as a thickness of the molding unit apart, the magnets may not be magnetized to a desired strength. Thus, a decline in efficiency of magnetization caused a reduced performance of a motor.

DISCLOSURE

Technical Problem

The present invention is directed to providing a rotor capable of facilitating magnetization of magnets and a method of manufacturing the same which manufactures a rotor by dual injection molding in which first injection molding is partially performed at a plurality of magnets in an unmagnetized state and rotor cores alternately disposed with the plurality of magnets, and second injection molding is performed at the entire rotor after the magnets are magnetized.

Technical Solution

In one embodiment, a rotor may include a rotor assembly which includes magnets and rotor cores, and a molding unit which includes a first molding unit disposed by being firstly injection molded to support the rotor assembly before the magnets are magnetized and a second molding unit disposed by being secondly injection molded to support the rotor assembly after the magnets are magnetized.

In addition, according to an embodiment, the first molding unit may be disposed at one portion of the rotor assembly. Specifically, the first molding unit may be disposed such that at least one of inner end portions and outer end portions of the rotor cores are exposed, and may be disposed on at least one of an upper surface and a lower surface of the rotor assembly.

In addition, according to an embodiment, the first molding unit may be disposed to connect the whole rotor assembly disposed in a ring shape, or disposed at each part of the rotor assembly which is divided into a plurality of parts.

In addition, according to an embodiment, a position determination groove which determines a magnetization position may be formed at one side surface of the first molding unit.

In addition, according to an embodiment, a filling hole may be formed at the rotor cores such that the first molding unit is disposed, and a filling groove may be formed at at least one of the outer end portions and the inner end portions of the rotor cores. Also, an interference protrusion may be formed at at least one of the outer end portions and the inner end portions of the rotor cores, and mounting protrusions may be formed on surfaces abutting the magnets of the rotor cores.

In addition, according to an embodiment, the magnets may be alternately disposed with the rotor cores.

In addition, according to an embodiment, the magnetization of the magnets may be performed through one of the inner end portions and the outer end portions of the rotor cores. In this case, a ratio (Hm/Wc) of a length of the magnet (Hm) with respect to the width of the end portion (Wc) at which the magnetization of the magnets is performed is in a range of 0.5 to 5.5.

In addition, according to an embodiment, the magnetization of the magnets may be performed through the inner end portions and the outer end portions of the rotor cores. In this case, a ratio (Hm/WcL) of a length of the magnet (Hm) with respect to the width of the inner end portion or the outer end portion with a larger width (WcL) is in a range of 0.5 to 5.5.

In addition, according to an embodiment, the molding unit may further include a serration to which a driving shaft is connected, and the second molding unit may be connected to the serration by insert injection molding, bending, or a connection member.

In addition, according to an embodiment, the rotor may further include a frame formed of metal connected to the molding unit.

In addition, according to an embodiment, the second molding unit may be secondly injection molded when the rotor assembly is supported by the frame.

In addition, according to an embodiment, the frame may have a cylindrical shape, and an outer circumferential surface of the molding unit may be connected to an inner circumferential surface of the frame. Also, the frame may have a cylindrical shape with one open surface, and the other unopened surface may have a plurality of circles of different diameters.

In addition, according to an embodiment, the second molding unit may be disposed to support an outer circumferential side of the rotor assembly. Specifically, the second molding unit may be formed to extend a predetermined length toward the outer circumferential side of the rotor assembly.

In one embodiment, a method of manufacturing a rotor may include providing a rotor assembly by alternately disposing magnets and rotor cores, providing, by first injection molding, a first molding unit for supporting the rotor assembly, magnetizing the magnets by supplying magnetization flux using a magnetizer, and providing, by second injection molding, a second molding unit for supporting the rotor assembly and the first molding unit.

Advantageous Effects

According to the rotor and the method of manufacturing the same described above, a rotor is manufactured by dual injection molding, such that the magnets may be easily magnetized after first injection molding and before second injection molding.

DESCRIPTION OF DRAWINGS

FIG. 25 is a flow chart about a method of manufacturing a rotor according to an embodiment.

MODES OF THE INVENTION

Figure 1:
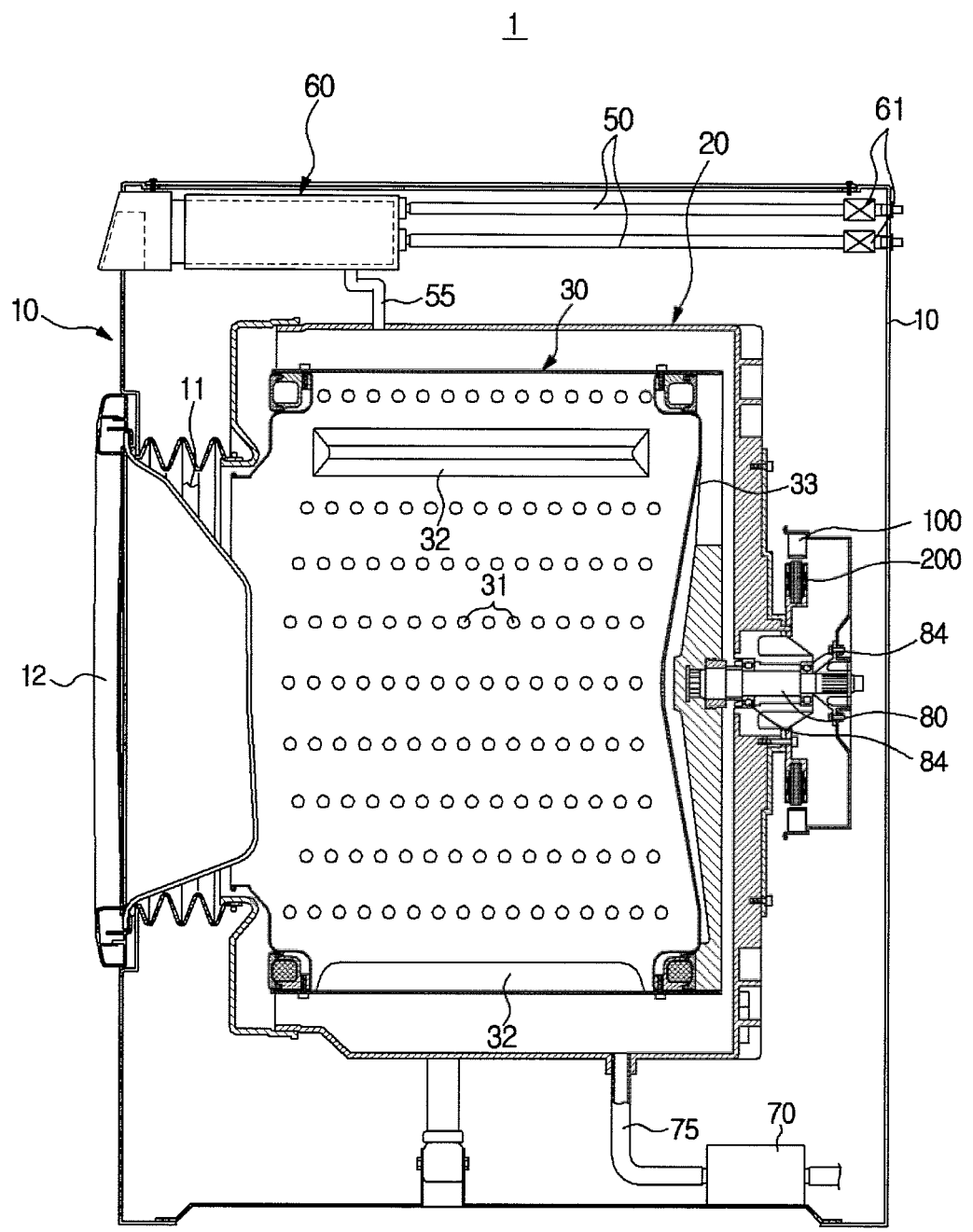
FIG. 1 is a view illustrating a washing machine according to an embodiment.

Hereinafter, the present invention will be described in detail by embodiments to be described with reference to the accompanying drawings such that those of ordinary skill in the art can easily understand and practice the present invention. However, in describing the present invention, when detailed description of related known functions or components is deemed to make the gist of the embodiments of the present invention unnecessarily vague, the detailed description thereof will be omitted.

Terms used below are terms which have been selected in consideration of functions in the embodiments. Meanings of the terms may be different in accordance with intentions or practices of a user and an operator. Thus, the terms used in the embodiments to be described below should be construed as certain meanings when the meanings are defined below, and construed as meanings generally perceived by those of ordinary skill in the art when specific definitions are not given.

Furthermore, even if aspects or configurations of embodiments selectively described below are illustrated in the drawings as one integrated configuration, it should be understood that the aspects or the components may be freely combined as long as there are no descriptions to the contrary and there are no technical contradictions resulting in confusion to those of ordinary skill in the art.

Hereinafter, an embodiment of a rotor and a method of manufacturing the same will be described with reference to the accompanying drawings.

Although the rotor to be described below may be applied to various types of devices, such as a washing machine, an air conditioner, an electric vehicle, a light rail transit system, an electric bicycle, and a small generator, which use a motor as a power source, the rotor applied to the washing machine will be described below as an example for convenience.

In addition, types of the rotor include an outer type rotor in which the rotor is disposed outside a stator, and an inner type rotor in which a stator is disposed outside the rotor. Although the rotor to be described below may be applied to both the outer type rotor and the inner type rotor, the outer type rotor will be mostly described below.

Hereinafter, an embodiment of a washing machine including a rotor will be described with reference to FIG. 1.

FIG. 1 is a view illustrating a washing machine according to an embodiment.

As illustrated in FIG. 1, a washing machine 1 includes a cabinet 10 to form an exterior of the washing machine 1, a tub 20 disposed inside the cabinet 10, a drum 30 rotatably disposed inside the tub 20, and a motor 40 to rotate the drum 30.

An inlet 11 is formed at a front surface portion of the cabinet 10 to introduce objects to be washed into the drum 30. The inlet 11 is opened and closed by a door 12 installed at the front surface portion of the cabinet 10.

A water supply pipe 50 to supply wash water to the tub 20 is installed at an upper portion of the tub 20. One end of the water supply pipe 50 is connected to an external water supply source, and the other end of the water supply pipe 50 is connected to a detergent feed device 60. The detergent feed device 60 is connected to the tub 20 through a connection pipe 55. Water supplied through the water supply pipe 50 passes through the detergent feed device 60 to be supplied to the tub 20 together with a detergent.

A drain pump 70 and a drain pipe 75 to discharge water inside the tub 20 toward an outside of the cabinet 10 are installed below the tub 20.

A plurality of through-holes 31 to circulate the wash water are formed along the circumference of the drum 30, and a plurality of lifters 32 are installed at an inner circumferential surface of the drum 30 to lift and lower the objects to be washed when the drum 30 rotates.

The drum 30 and the motor 40 are connected through a driving shaft 80. That is, a direct drive (DD) motor may be disposed as the motor 40. The driving shaft 80 transfers a rotary force of the motor 40 to the drum 30. One end of the driving shaft 80 is connected to the drum 30, and the other end of the driving shaft 80 extends toward an outside of a rear wall 21 of the tub 20.

A bearing housing 82 is installed in the rear wall 21 of the tub 20 to rotatably support the driving shaft 80. The bearing housing 82 may be provided with an aluminum alloy and inserted into the rear wall 21 of the tub 20 when injection-molding the tub 20. Bearings 84 are installed between the bearing housing 82 and the driving shaft 80 such that the driving shaft 80 may smoothly rotate.

Hereinafter, a first embodiment of a motor will be described with reference to FIGS. 2 to 5.

Figure 2:
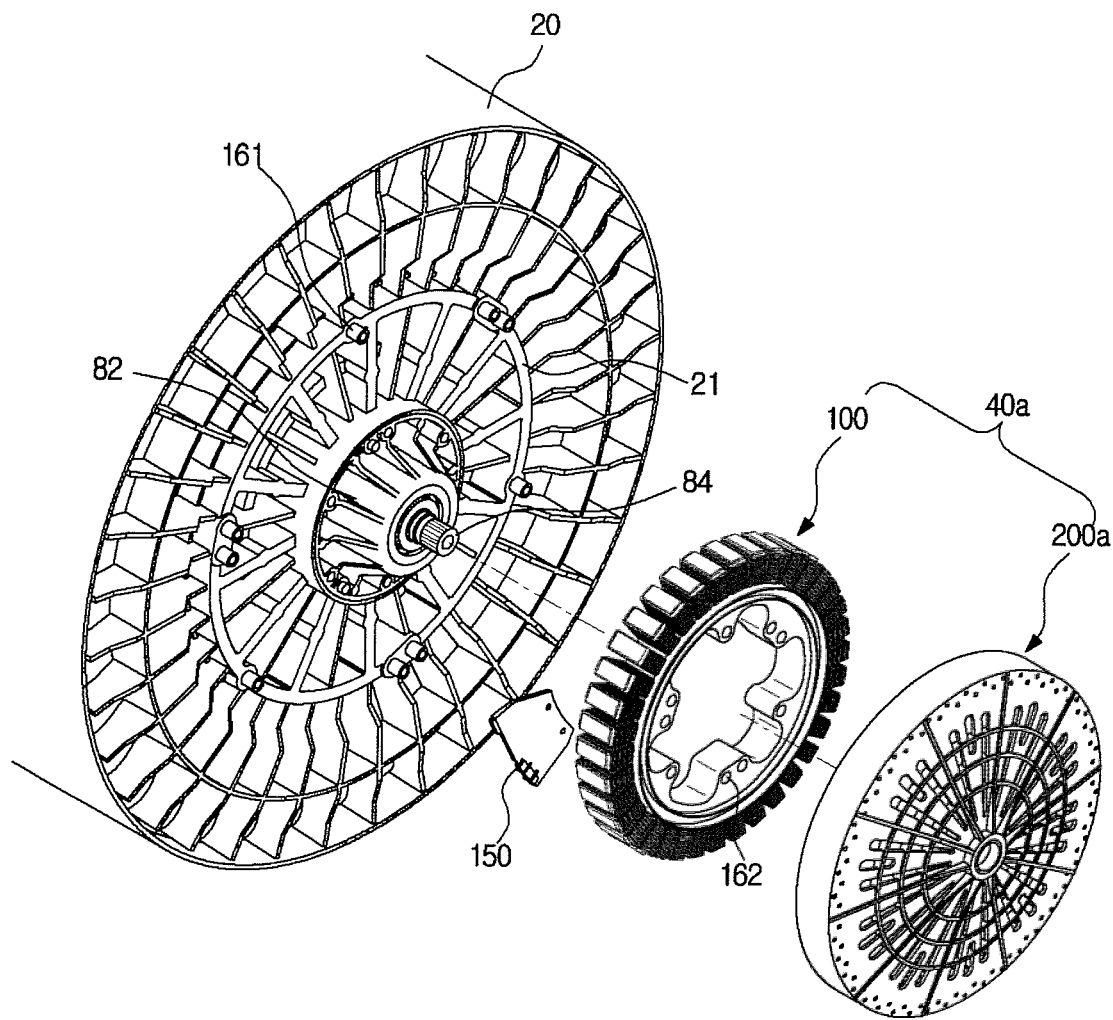
FIG. 2 is an exploded perspective view of a tub and a motor according to a first embodiment.

FIG. 2 illustrates an exploded appearance of a tub and a motor.

A motor 40a is connected to the rear wall 21 of the tub 20 together with a sensor assembly 150.

Specifically, the bearings 84 may be disposed at the center of the rear wall 21 of the tub 20, and the bearing housing 82 having the same center point as the bearings 84 and a larger diameter than the bearings 84 may be disposed at the outer circumferential side of the bearings 84. Also, a circular motor mounting unit having the same center point as the bearing housing 82 and a larger diameter than the bearing housing 82 may be disposed at the outer circumferential side of the bearing housing 82. Also, connection protrusions 161 may be disposed along the outer circumference of the circular motor mounting unit.

At least one connection protrusion 161 may be disposed at the outer circumference of the motor mounting unit, and the connection protrusions 161 may protrude from the outer circumference of the motor mounting unit toward the motor 40a. For example, the connection protrusions 161 may protrude to be perpendicular to the rear wall 21 of the tub 20.

In addition, the connection protrusions 161 may be disposed to be symmetrical or asymmetrical along an extension line of a diameter passing through the center of the motor mounting unit. Also, at least one other connection protrusion 161 may be disposed near one connection protrusion 161. That is, arrangements of the connection protrusions 161 may coincide with arrangements of connection holes 162 of a stator 100. For example, as illustrated in FIG. 2, two connection protrusions 161 and one connection protrusion 161 may be alternately disposed in the circumferential direction.

In addition, the connection protrusions 161 may have column-like shapes, and cross-sections thereof may have various shapes coinciding with the connection holes 162 of the stator 100. For example, as illustrated in FIG. 2, the connection protrusions 161 may have cylindrical shapes to coincide with the circular connection holes 162.

Other than the above, various methods may also be used to connect the sensor assembly 150 and the motor 40a to the rear wall 21 of the tub 20.

The sensor assembly 150 is disposed near the motor 40a to detect a rotational displacement of the motor 40a.

Specifically, the sensor assembly 150 may be disposed at one side of the stator 100 to detect a rotation speed, torque, a rotation angle, and a frequency of a rotor 200a. The sensor assembly 150 may be disposed between the tub 20 and the stator 100 as illustrated in FIG. 2, and the sensor assembly 150 may also be disposed behind the tub 20 and the stator 100 to face the rear wall 21 of the tub 20. Also, the sensor assembly 150 may include a groove coinciding with the connection protrusions 161 of the motor mounting unit and similar to the connection holes 162 of the stator 100. Also, the width of a side at which the groove is disposed may be equal to or smaller than the width of the outer circumferential side in order to detect the rotational displacement of the rotor 200a disposed at the outer circumferential side of the stator 100, and the width of the side at which the groove is disposed may be equal to or smaller than the width of the inner circumferential side in order to detect the rotational displacement of the rotor 200a disposed at the inner circumferential side of the stator 100. Also, one sensor assembly 150 may be provided as illustrated in FIG. 2, but two or more sensor assemblies 150 may also be provided. The number of the sensor assemblies 150 being provided may be determined in consideration of a structure and unit cost of the rotor 200a being manufactured, an error range of a rotational displacement to be detected, etc.

The sensor assembly 150 may include a rotation speed sensor to detect the rotational displacement of the motor 40a. Specifically, the sensor assembly 150 may include a Hall sensor.

An N-type semiconductor is used in the Hall sensor, and a magnetic field may be expressed as voltage by the Hall effect. Accordingly, the Hall sensor detects a change in the magnetic field due to rotation of the rotor 200a, thereby being able to output an angle, a frequency, an operation time, etc. related to the rotational displacement of the rotor 200a.

Not only the Hall sensor, but also angle sensors such as a resolver, a potentiometer, an absolute encoder, an incremental encoder, and the like may be used as a means for detecting the rotational displacement of the rotor 200a.

Specifically, the resolver is a type of a rotation transformer and is an analog type angle sensor which is connected to a shaft of the motor 40a to output alternating current voltage proportional to a position of the rotor 200a. The potentiometer is an angle sensor which varies a variable resistance value in accordance with an angle to calculate an electrical input directly proportional to a rotation angle. Also, the absolute encoder is an angle sensor which detects a degree of rotation at a corresponding position using an optical pulse wave without setting a reference position, and the incremental encoder is an angle sensor which calculates an angle through an increase and a decrease in an angle measured by setting a reference position and detects an degree of rotation at a corresponding position using an optical pulse wave.

In addition, the rotation speed sensor may calculate a rotation speed of the motor 40a based on the rotation angle, the frequency, the operation time, and the like of the rotor 200a detected by the rotation speed sensor, and provide the calculated rotation speed of the motor 40a to a component for controlling the motor 40a.

In addition, although the sensor assembly 150 may calculate the rotation speed of the rotor 200a by detecting a mechanical movement of the rotor 200a, the sensor assembly 150 may also calculate the rotation speed of the rotor 200a by detecting an electrical change. Specifically, the sensor assembly 150 may detect a change in a driving power supplied to a coil 120 or a counter-electromotive force generated by the rotation of the rotor 200a to calculate the rotation speed of the rotor 200a.

Other than the above, various types of sensors which measure an angle and a frequency may also be used as the rotation speed sensor.

The motor 40a may be connected to the motor mounting unit provided at the rear wall 21 of the tub 20, and the motor 40a may include the stator 100 and the rotor 200a.

The motor 40a applied to the first embodiment will be described in detail with reference to FIGS. 3 to 5 below.

Figure 3:
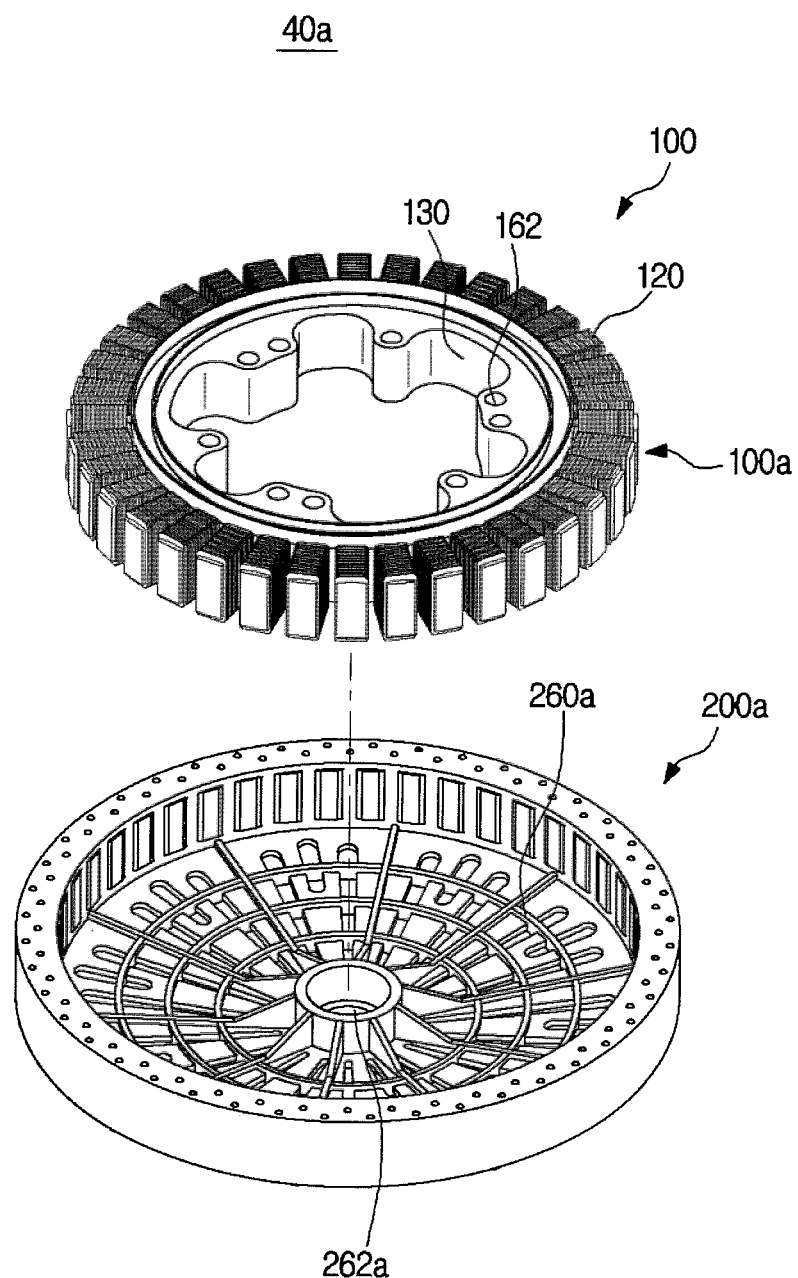
FIG. 3 is an exploded perspective view of the motor according to the first embodiment.

FIG. 3 illustrates an exploded appearance of a motor.

The motor 40a may include the stator 100 and the rotor 200a.

The stator 100 may include a stator core 130, the coil 120, and the connection holes 162.

The stator core 130 forms a frame of the stator 100 to maintain the shape of the stator 100, and may provide a passage in which a magnetic field is formed such that, when one tooth is magnetized by power, magnetization of another tooth adjacent to the one tooth is induced to a polarity different from the polarity of the one tooth magnetized by the power.

In addition, the stator core 130 may be formed to have a cylindrical shape, and may be formed by stacking press-processed steel plates. Also, a plurality of teeth may be disposed in the circumferential direction at the outer circumferential side of the stator core 130, and a plurality of connection holes 162 may be disposed at the inner circumferential side of the stator core 130. Other than the above, the stator core 130 may be formed in various shapes to maintain the shape of the stator 100 and have the teeth and the connection holes 162.

Here, the plurality of teeth may be disposed at the outer circumference of the stator core 130 to divide a space between the stator 100 and the rotor 200a outside of the stator core 130 into a plurality of slots along the circumferential direction. For example, the number of teeth at the stator core 130 may be 24 to 48. Also, the teeth may provide a space in which the coil 120 is disposed, and may be magnetized to either one of an N-pole or an S-pole by a magnetic field formed due to the power supplied to the coil 120.

In addition, the teeth may have a Y-shape, and surfaces adjacent to the rotor 200a among the outer surfaces of the teeth may have a gently curved surface such that an attractive force and a repulsive force which interact with rotor cores 220 in the rotor 200a are efficiently generated. Other than the above, the teeth may be formed in various structures to provide the space in which the coil 120 is disposed and efficiently generate the attractive force and the repulsive force which interact with the rotor cores 220.

The coil 120 may be disposed at insulators disposed on the teeth of the stator core 130 and form a magnetic field due to the power applied thereto. By this, the coil 120 may magnetize the teeth at which the coil 120 is disposed.

In addition, the power supplied to the coil 120 may be a three-phase form or a single-phase form.

In addition, the coil 120 may be wound by a concentrated winding method or a distributed winding method. The concentrated winding method is a method of winding the coil 120 such that a number of slots at one pole per one phase becomes one, and the distributed winding method is a method of winding the coil 120 by dividing the coil 120 into two or more slots in an electric device to which slots are attached. Other than the above, the coil 120 may be wound by various methods to efficiently magnetize the teeth.

Furthermore, a material used in the coil 120 may be copper, aluminum, or a composite material of copper and aluminum. Other than the above, the coil 120 may be formed of various materials to efficiently magnetize the teeth.

The connection holes 162 are disposed at the inner circumferential surface of the stator core 130 to provide a space for insertion of the connection protrusions 161 of the motor mounting unit disposed at the rear wall 21 of the tub 20.

In addition, the connection protrusions 161 may be inserted into the connection holes 162 and fixed by the connection member. For example, after the connection protrusions 161 are inserted into the connection holes 162, a bolt 262b with a diameter smaller than that of the connection holes 162 may be inserted to provide a fixing force to maintain a coupled state of the stator 100 and the tub 20.

In addition, the shapes of the connection holes 162 may coincide with the shapes of the connection protrusions 161 disposed at the rear wall 21 of the tub 20. For example, as illustrated in FIG. 3, the connection holes 162 may be circular holes to coincide with the connection protrusions 161 of cylindrical shapes.

The rotor 200a rotates by interacting with a magnetic field formed by magnets 240 and rotor cores 220 disposed along the inner circumferential surface of the rotor 200a and a magnetic field formed due to the power supplied to the coil 120 of the stator 100.

The rotor 200a will be described in detail with reference to FIGS. 4A to 5 below.

Figure 4A:
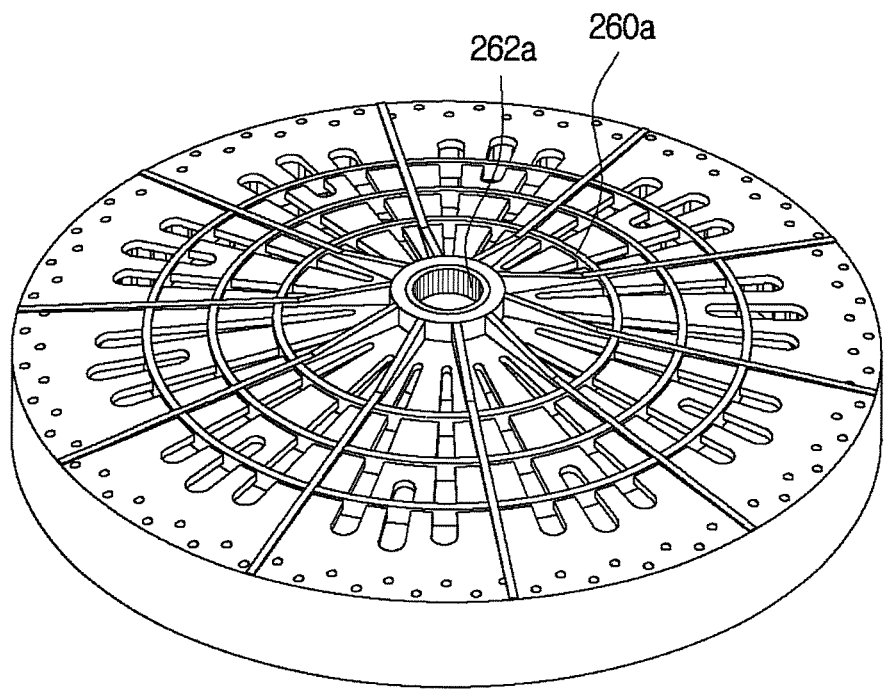
FIGS. 4A and 4B are perspective views of a rotor according to the first embodiment.
Figure 4B:
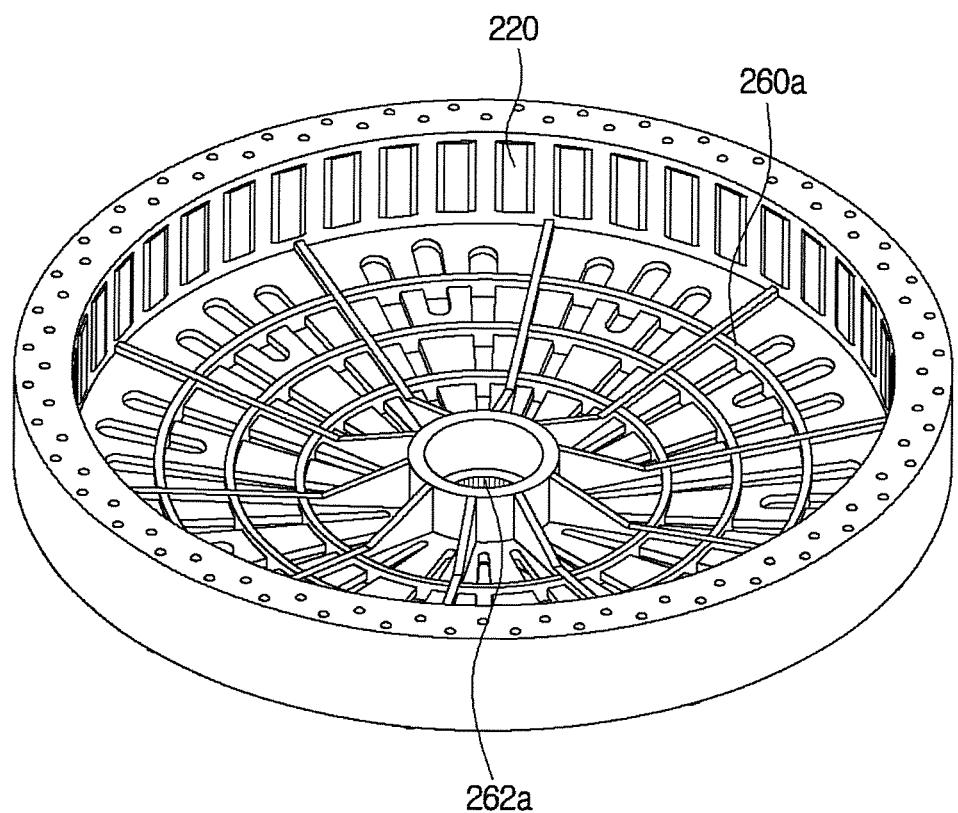
Figure 5:
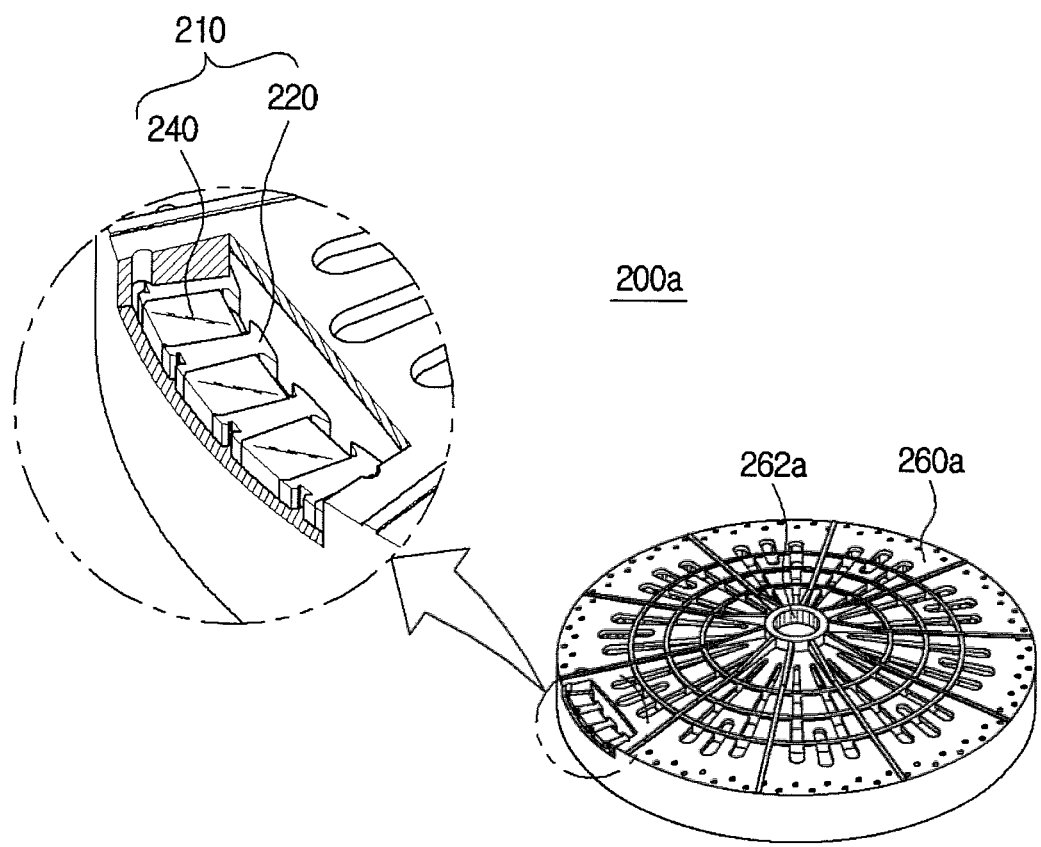
FIG. 5 is a view illustrating an inner portion of the rotor according to the first embodiment.

FIG. 4A illustrates an exterior of a rotor at a side at which a stator is not disposed, and FIG. 4B illustrates an exterior of a rotor at a side at which a stator is disposed. Also, FIG. 5 illustrates an inside of a rotor.

The rotor 200a may include a ring-shaped rotor assembly 210 and a molding unit 260a supporting the rotor assembly 210.

The rotor assembly 210 forms the magnetic field due to the magnets 240, and allows the attractive force and the repulsive force to interact with the magnetic field formed due to the power supplied to the coil 120. Also, the rotor assembly 210 has a ring shape.

The rotor assembly 210 may include the rotor cores 220 disposed in a radial shape and the magnets 240 disposed between the rotor cores 220.

The rotor cores 220 and the magnets 240 may be alternately disposed. The rotor assembly 210 in which the rotor cores 220 and the magnets 240 are alternately disposed may be disposed to trace a curved line or have a ring shape.

The rotor cores 220 and the magnets 240 will be described in detail with reference to FIGS. 10A to 15P.

The molding unit 260a supports the rotor assembly 210 and transfers a rotary force generated by the rotor assembly 210 to the driving shaft.

Specifically, the molding unit 260a is formed outside the rotor assembly 210 to surround the rotor assembly 210, and prevents scattering of the rotor assembly 210 including the rotor cores 220 and the magnets 240 therein. Also, the thickness of the molding unit 260a may be determined based on a centrifugal force applied to the rotor assembly 210, an output of the motor 40a, and stiffness of a material of the molding unit 260a. For example, the thickness of the molding unit 260a may be 1 mm to 5 mm.

In addition, the molding unit 260a may include a cylindrical partition and circular partitions coupled to a lower surface of the cylindrical partition formed along the ring-shaped rotor assembly 210. For example, as illustrated in FIGS. 4A and 4B, the molding unit 260a may have a cylindrical shape with one open surface.

In addition, the rotor cores 220 may be partially exposed at a surface of the cylindrical partition near the stator 100 to facilitate an interaction with the magnetic field formed at the stator core 130. That is, the rotor cores 220 at the inner circumferential surface of the molding unit 260a may be partially exposed to the outside in the outer type rotor 200a, and the rotor cores 220 at the outer circumferential surface of the molding unit 260a may be partially exposed to the outside in the inner type rotor 200a.

In addition, the rotor cores 220 and the magnets 240 may not be exposed to the outside at a surface of the cylindrical partition not near the stator 100 to prevent a magnetic flux formed by the magnets 240 from leaking in a direction facing the stator 100. That is, the rotor cores 220 and the magnets 240 at the outer circumferential surface of the molding unit 260a may not be exposed to the outside in the outer type rotor 200a, and the rotor cores 220 and the magnets 240 at the inner circumferential surface of the molding unit 260a may not be exposed to the outside in the inner type rotor 200a.

In addition, to prevent scattering of the rotor assembly 210, the molding unit 260a may extend a predetermined length toward the outer circumferential side at the surface of the cylindrical partition not near the stator 100. For example, the molding unit 260a may extend 2 mm to 3 mm toward the outer circumferential side.

In addition, the molding unit 260a may include first molding units 266 which support the rotor assembly 210 before the magnets 240 are magnetized, second molding units 268 which support the rotor assembly 210 after the magnets 240 are magnetized to prevent scattering of the rotor assembly 210, and a serration 262a which transfers the rotary force generated by the rotor 200a to the driving shaft.

In addition, a material of the molding unit 260a may be a non-magnetic material. Specifically, a resin may be used as the material of the molding unit 260a to prevent a magnetic flux from leaking to a side surface facing a side surface adjacent to the rotor 200a. For example, an epoxy resin, urethane resin, polybutyrene terephthalate (PBT) resin, and polyethylene terephthalate (PET) resin may be used as the material of the molding unit 260a. Also, a material of the first molding units 266 and a material of the second molding units 268 may be the same or different from each other. Other than the above, various materials may be used as the material of the molding unit 260a to prevent a leak of the magnetic flux.

The first molding units 266, the second molding units 268, and the serration 262a will be described in detail with reference to FIGS. 16 to 21B.

A molding unit 260b supports the rotor assembly 210 and transfers a rotary force generated by the rotor assembly 210 to the driving shaft.

Specifically, the molding unit 260b is formed outside the rotor assembly 210 to surround the rotor assembly 210, and prevents scattering of the rotor assembly 210 including the rotor cores 220 and the magnets 240 therein. Also, the thickness of the molding unit 260b may be determined based on a centrifugal force applied to the rotor assembly 210, an output of the motor 40b, and stiffness of a material of the molding unit 260b. For example, the thickness of the molding unit 260b may be 1 mm to 5 mm.

Figure 7:
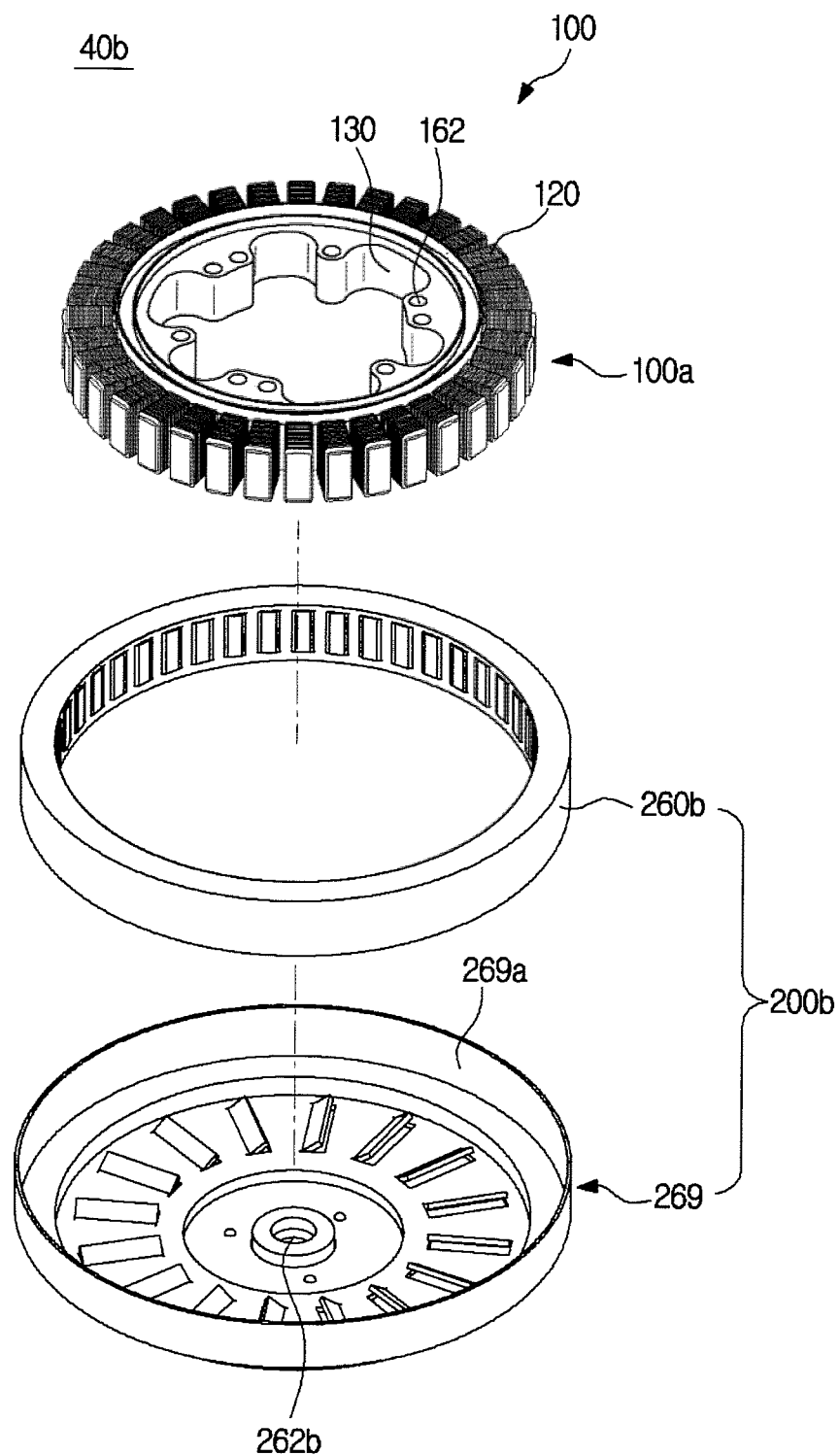
FIG. 7 is an exploded perspective view of the motor according to the second embodiment.
Figure 9:
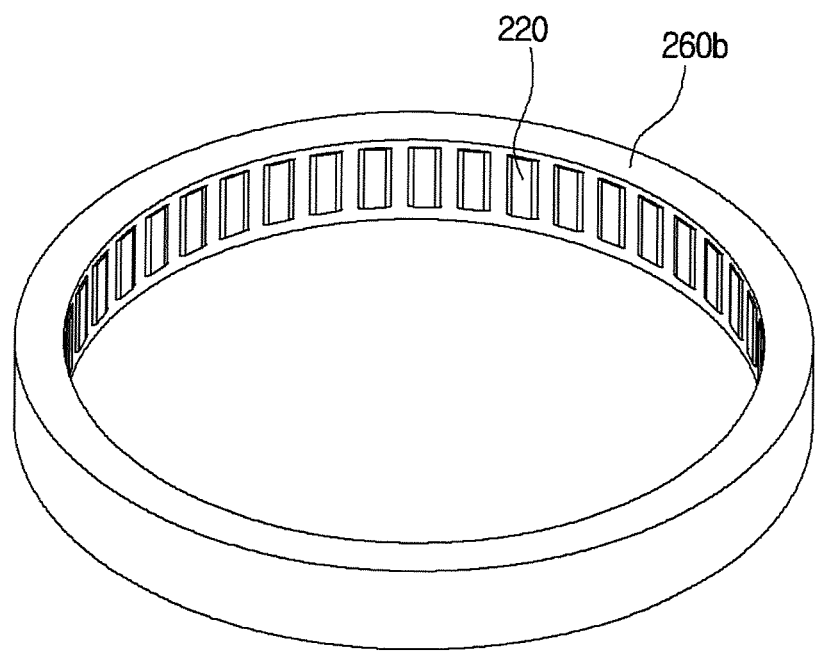
FIG. 9 is a perspective view of a rotor assembly and a molding unit according to the second embodiment.

In addition, a cylindrical partition may be formed along the ring-shaped rotor assembly 210 in the molding unit 260b. For example, as illustrated in FIGS. 7 and 9, the molding unit 260b may have a cylindrical shape with open upper and lower surfaces.

In addition, the rotor cores 220 may be partially exposed at a surface of the cylindrical partition near the stator 100 to facilitate an interaction with the magnetic field formed at the stator core 130. That is, the rotor cores 220 at the inner circumferential surface of the molding unit 260b may be partially exposed to the outside in an outer type rotor 200b, and the rotor cores 220 at the outer circumferential surface of the molding unit 260b may be partially exposed to the outside in an inner type rotor 200b.

In addition, the rotor cores 220 and the magnets 240 may not be exposed to the outside at a surface of the cylindrical partition not near the stator 100 to prevent a magnetic flux formed by the magnets 240 from leaking in a direction facing the stator 100. That is, the rotor cores 220 and the magnets 240 at the outer circumferential surface of the molding unit 260b may not be exposed to the outside in the outer type rotor 200b, and the rotor cores 220 and the magnets 240 at the inner circumferential surface of the molding unit 260b may not be exposed to the outside in the inner type rotor 200b.

In addition, to prevent scattering of the rotor assembly 210, the molding unit 260b may extend a predetermined length toward the outer circumferential side at the surface of the cylindrical partition not near the stator 100. For example, the molding unit 260b may extend 2 mm to 3 mm toward the outer circumferential side.

The molding unit 260b formed in a cylindrical shape may be supported by being connected to a frame 269.

Specifically, the frame 269 may have a cylindrical shape with one open surface and include a highly stiff metal material.

A highly stiff metal material may be used as the material of the frame 269 to prevent scattering of the rotor assembly 210 by supporting the rotor assembly 210 and the molding unit 260b. For example, steel or aluminum (Al) may be used as the material of the frame 269. Other than the above, various materials which are highly stiff may be used as the material of the frame 269.

In addition, the frame 269 may include a cylindrical partition 269a and circular partitions coupled to a lower surface of the cylindrical partition 269a formed at a side of a surface adjacent to the outer circumferential surface of the second molding units 268. For example, as illustrated in FIGS. 7 and 8B, the frame 269 may have a cylindrical shape with one open surface.

Figure 8A:
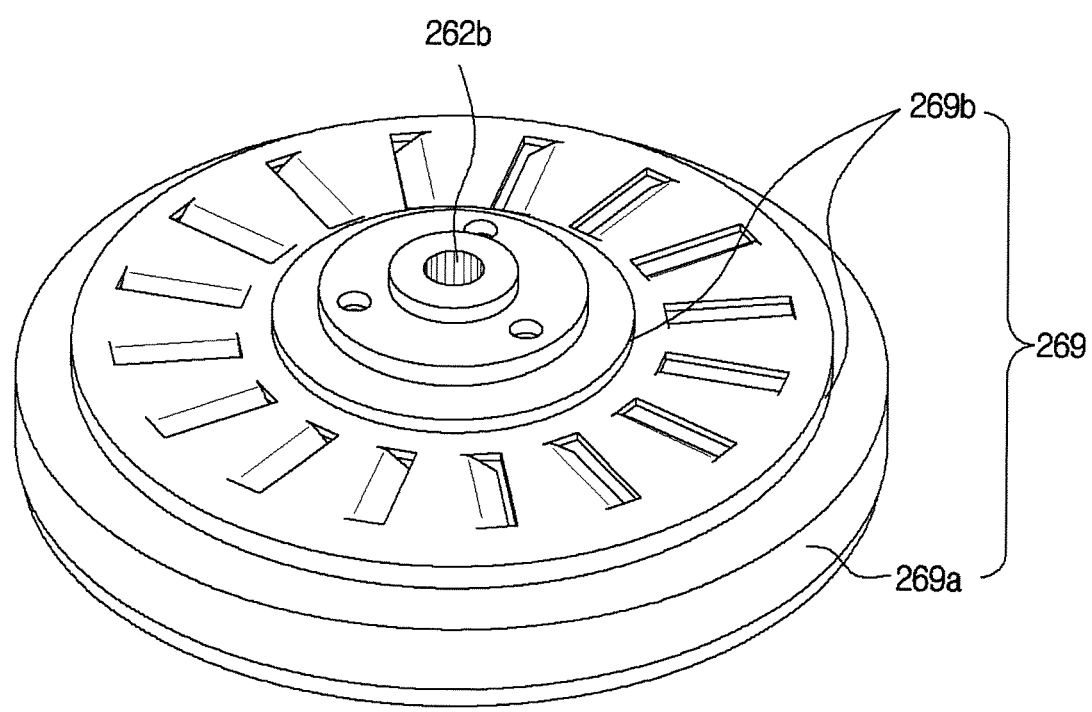
FIGS. 8A and 8B are perspective views of a rotor according to the second embodiment.
Figure 8B:
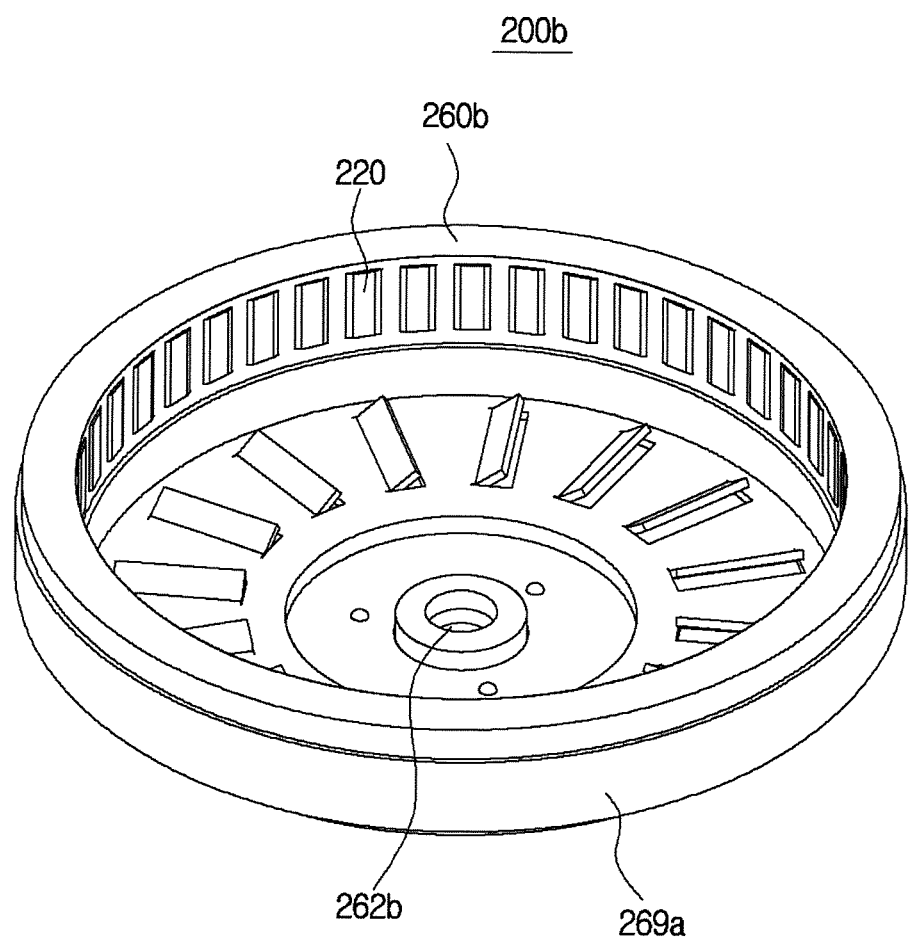

In addition, as illustrated in FIG. 8A, circular shapes having the same center and different diameters may be layered on the lower surface of the cylindrical partition 269a. Specifically, since the frame 269 may be deformed due to the centrifugal force acting toward the outer circumferential side when the frame 269 rapidly rotates, a diameter of a lower surface of the frame 269 may be reduced to decrease the centrifugal force in order to prevent the deformation of the frame 269. Accordingly, a plurality of bending shapes may be provided on the lower surface of the frame 269 such that diameters of partitions 269b provided at the lower portion of the cylindrical partition 269a may be smaller than that of the cylindrical partition 269a. That is, as illustrated in FIG. 8A, the diameter of the frame 269 may become gradually smaller toward a side at which a serration 262b is disposed.

In addition, the frame 269 and the second molding units 268 may be connected through indenting or fastening by coupling with a connection member. Here, the connection member may be the bolt 262b and a nut 262c, or may be an adhesive. Other than the above, various methods may be used to connect the frame 269 to the second molding units 268.

In addition, the frame 269 and the serration 262b may be connected through indenting, fastened by coupling with a connection member, or connected by insert injection molding. Here, the connection member may be the bolt 262b and the nut 262c, or may be an adhesive. Other than the above, various methods may be used to connect the frame 269 to the serration 262b.

In addition, the molding unit 260b may include the first molding units 266 which support the rotor assembly 210 before the magnets 240 are magnetized, the second molding units 268 which support the rotor assembly 210 after the magnets 240 are magnetized to prevent scattering of the rotor assembly 210, the frame 269 having the first molding units 266 and the second molding units 268 connected thereto and supporting the second molding units 268, and the serration 262b which transfers the rotary force generated by the rotor 200b to the driving shaft.

In addition, a material of the molding unit 260b may be a non-magnetic material. Specifically, a resin may be used as the material of the molding unit 260b to prevent a magnetic flux from leaking to a side surface facing a side surface adjacent to the rotor 200b. For example, an epoxy resin, urethane resin, polybutyrene terephthalate (PBT) resin, and polyethylene terephthalate (PET) resin may be used as the material of the molding unit 260b. Also, a material of the first molding units 266 and a material of the second molding units 268 may be the same or different from each other. Other than the above, various materials may be used as the material of the molding unit 260b to prevent a leak of the magnetic flux.

The first molding units 266, the second molding units 268, and the serration 262b will be described in detail with reference to FIGS. 16 to 21B below.

Hereinafter, a second embodiment of a motor will be described with reference to FIGS. 6 to 9.

Figure 6:
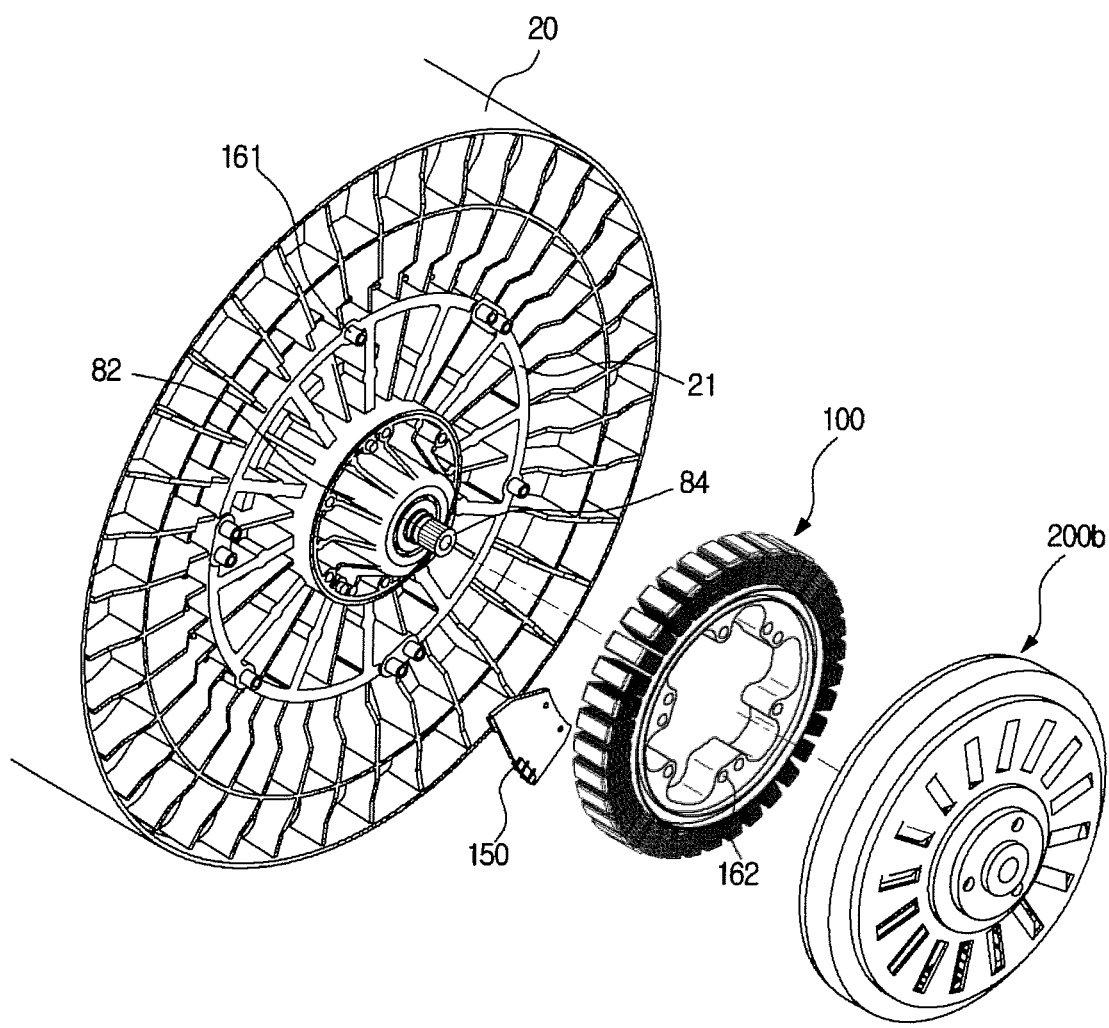
FIG. 6 is an exploded perspective view of a tub and a motor according to a second embodiment.

FIG. 6 illustrates an exploded view of a tub and a motor.

The motor 40b is connected to the rear wall 21 of the tub 20 together with the sensor assembly 150.

The tub 20 and the sensor assembly 150 according to the second embodiment may be the same as or different from the tub 20 and the sensor assembly 150 according to the first embodiment.

The motor 40b is connected to the motor mounting unit provided at the rear wall 21 of the tub 20, and the motor 40b may include the stator 100 and the rotor 200b.

The motor 40b applied to the second embodiment will be described in detail with reference to FIGS. 7 to 9.

FIG. 7 illustrates an exploded view of the motor.

The motor 40b may include the stator 100 and the rotor 200b.

The stator 100 may include the stator core 130, the coil 120, and the connection holes 162.

The stator core 130 forms a frame of the stator 100 to maintain the shape of the stator 100, and may provide a passage in which a magnetic field is formed such that, when one tooth is magnetized by power, magnetization of another tooth adjacent to the one tooth is induced to a polarity different from the polarity of the one tooth magnetized by the power.

In addition, the stator core 130 may be formed to have a cylindrical shape, and may be formed by stacking press-processed steel plates. Also, a plurality of teeth may be disposed in the circumferential direction at the outer circumferential side of the stator core 130, and a plurality of connection holes 162 may be disposed at the inner circumferential side of the stator core 130. Other than the above, the stator core 130 may be formed in various shapes to maintain the shape of the stator 100 and have the teeth and the connection holes 162.

Here, the plurality of teeth may be disposed at the outer circumference of the stator core 130 to divide a space between the stator 100 and the rotor 200b outside of the stator core 130 into a plurality of slots along the circumferential direction. For example, the number of teeth at the stator core 130 may be 24 to 48. Also, the teeth may provide a space in which the coil 120 is disposed, and may be magnetized to either one of an N-pole or an S-pole by a magnetic field formed due to the power supplied to the coil 120.

In addition, the teeth may have a Y-shape, and surfaces adjacent to the rotor 200b among the outer surfaces of the teeth may have a gently curved surface such that attractive force and repulsive force which interact with the rotor cores 220 in the rotor 200b are efficiently generated. Other than the above, the teeth may be formed in various structures to provide the space in which the coil 120 is disposed and efficiently generate the attractive force and the repulsive force which interact with the rotor cores 220.

The coil 120 may be disposed at insulators disposed on the teeth of the stator core 130 and form a magnetic field due to the power applied thereto. By this, the coil 120 may magnetize the teeth at which the coil 120 is disposed.

In addition, the power supplied to the coil 120 may be a three-phase form or a single-phase form.

In addition, the coil 120 may be wound by a concentrated winding method or a distributed winding method. The concentrated winding method is a method of winding the coil 120 such that a number of slots at one pole per one phase becomes one, and the distributed winding method is a method of winding the coil 120 by dividing the coil 120 into two or more slots in an electric device to which slots are attached. Other than the above, the coil 120 may be wound by various methods to efficiently magnetize the teeth.

Furthermore, a material used in the coils 120 may be copper, aluminum, or a composite material of copper and aluminum. Other than the above, the coil 120 may be formed of various materials to efficiently magnetize the teeth.

The connection holes 162 are disposed at the inner circumferential surface of the stator core 130 to provide a space for insertion of the connection protrusions 161 of the motor mounting unit disposed at the rear wall 21 of the tub 20.

In addition, the connection protrusions 161 may be inserted into the connection holes 162 and fixed by the connection member. For example, after the connection protrusions 161 are inserted into the connection holes 162, the bolt 262b with a diameter smaller than that of the connection holes 162 may be inserted to provide a fixing force to maintain a coupled state of the stator 100 and the tub 20.

In addition, the shapes of the connection holes 162 may coincide with the shapes of the connection protrusions 161 disposed at the rear wall 21 of the tub 20. For example, as illustrated in FIG. 3, the connection holes 162 may be circular holes to coincide with the connection protrusions 161 of cylindrical shapes.

The rotor 200b rotates by interacting with a magnetic field formed by the magnets 240 and the rotor cores 220 disposed along the inner circumferential surface of the rotor 200b and a magnetic field formed due to the power supplied to the coil 120 of the stator 100.

The rotor 200b will be described in detail with reference to FIGS. 8A to 9 below.

FIG. 8A illustrates an exterior of a rotor at a side at which a stator is not disposed, and FIG. 8B illustrates an exterior of a rotor at a side at which a stator is disposed. Also, FIG. 9 illustrates exteriors of a rotor assembly and a molding unit.

The rotor 200b may include a ring-shaped rotor assembly 210a, a molding unit 260b supporting the rotor assembly 210a, and the frame 269 supporting the rotor assembly 210a and the molding unit 260b and transferring a driving force to a driving shaft.

The rotor assembly 210a forms the magnetic field due to the magnets 240, and allows the attractive force and the repulsive force to interact with the magnetic field formed due to the power supplied to the coil 120. Also, the rotor assembly 210a has a ring shape.

The rotor assembly 210a may include the rotor cores 220 disposed in a radial shape and the magnets 240 disposed between the rotor cores 220.

The rotor cores 220 and the magnets 240 may be alternately disposed. The rotor assembly 210a in which the rotor cores 220 and the magnets 240 are alternately disposed may be disposed to trace a curved line or have a ring shape.

The rotor cores 220 and the magnets 240 will be described in detail with reference to FIGS. 10A to 15P.

Hereinafter, embodiments of the rotor assembly 210a will be described with reference to FIGS. 10A and 10B.

Figure 10A:
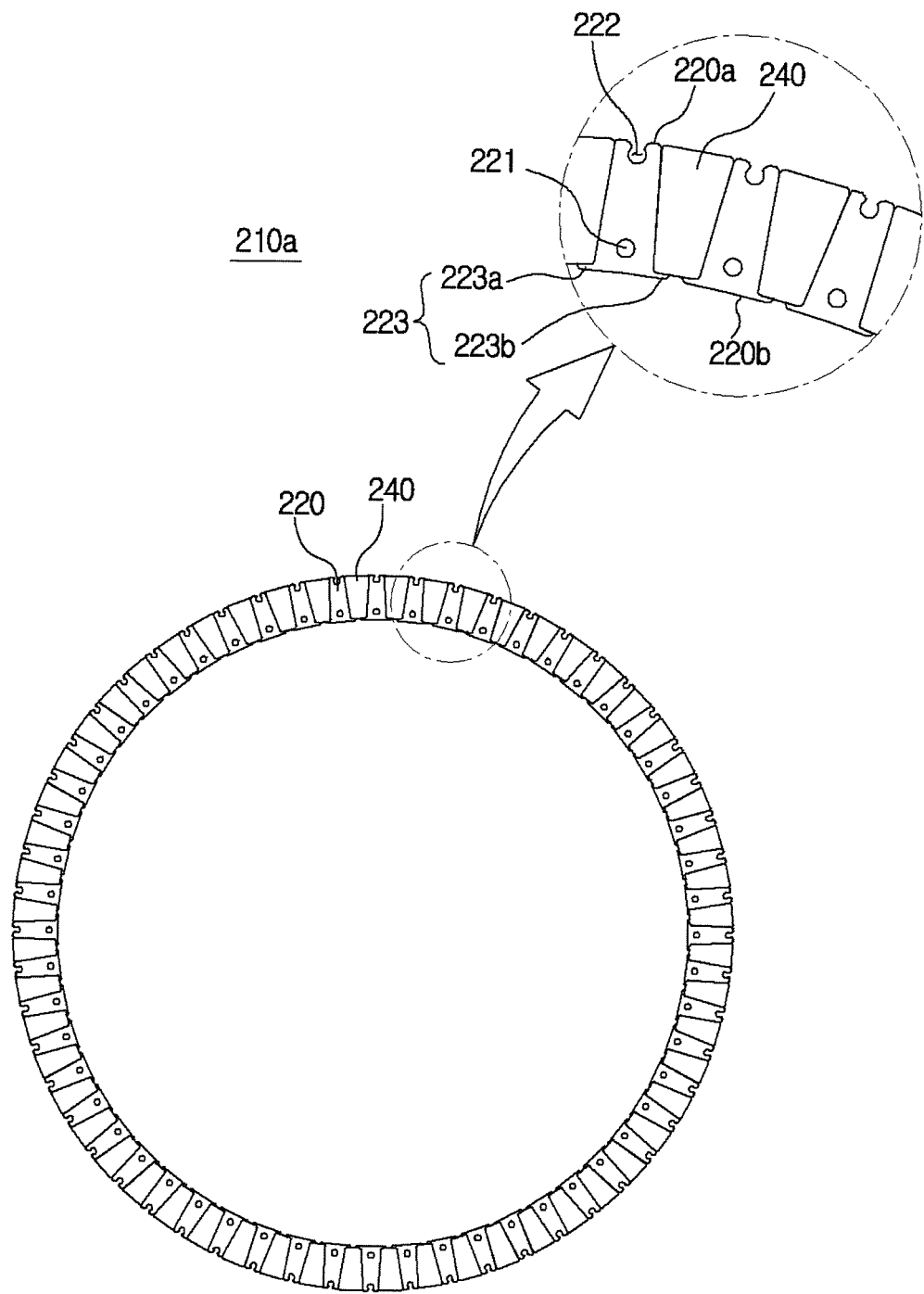
FIG. 10A is a view illustrating a rotor assembly according to an embodiment.

FIG. 10A is a view illustrating a rotor assembly according to an embodiment.

The plurality of rotor cores 220 support the magnets 240, and form a magnetic path on the magnets 240. The plurality of rotor cores 220 may be arranged in the circumferential shape to coincide with the outer shape of the stator 100. Also, the plurality of rotor cores 220 may be disposed apart from each other such that the magnets 240 may be accommodated between the rotor cores 220.

In addition, the number of the rotor cores 220 being disposed may be determined based on the number of teeth of the stator core 130, a coercive force and required output of the magnets 240, etc. For example, the number of the rotor cores 220 being disposed may be 24 to 56. Other than the above, various parameters may be used as a parameter to determine the number of the rotor cores 220.

In addition, the thickness of the rotor cores being disposed may be determined based on the number of teeth of the stator core 130, the coercive force and required output of the magnets 240, etc. For example, the thickness of the rotor cores 220 being disposed may be 5 mm or narrower. Other than the above, various parameters may be used as a parameter to determine the thickness of the rotor cores 220.

The rotor cores 220 include inner end portions 220b disposed adjacent to the center of the rotor 200, and outer end portions 220a disposed adjacent to the stator core 130. The rotor cores 220 may be formed by stacking plates formed by press-processing silicon steel plates.

In addition, the rotor core 220 may include a filling hole 221 or a filling groove 222. As an example, the filling hole 221 may be formed adjacent to the inner end portion 220b of the rotor core 220, and the filling groove 222 may be formed at the outer end portion 220a of the rotor core 220. An injection molding material may be filled in the filling hole 221 or the filling groove 222 when performing injection molding of the molding unit 260. As the molding unit 260 is injection molded by the injection molding material filled in the filling hole 221 or the filling groove 222, a fastening strength between the rotor cores 220 and the molding unit 260 may be reinforced.

The filling hole 221 may have a cross-section formed in a circular, oval, polygonal, or wedged shape. When the cross-section of the filling hole 221 is a circular shape, the diameter of the circular shape may be 0.5 mm to 5 mm. Also, the diameter of the filling groove 222 may become gradually larger from the outer end portion 220a to inner portion of the rotor cores 220.

A first fastening protrusion 223a and a second fastening protrusion 223b may be formed at the inner end portion 220b of the rotor core 220. The first fastening protrusion 223a and the second fastening protrusion 223b may respectively protrude from both left and right sides of the inner end portion 220b of the rotor core 220 in the inner circumferential direction of the rotor 200. The first fastening protrusion 223a may come in contact with the magnet 240 disposed at the left of the rotor core 220 such that the rotor core 220 may be supported toward the center of the rotor 200. The second fastening protrusion 223b may come in contact with the magnet 240 disposed at the right of the rotor core 220 such that the rotor core 220 may be supported toward the center of the rotor 200.

The plurality of magnets 240 disposed between the rotor cores 220 are arranged along the circumferential direction of the rotor 200 to be radially disposed with respect to the center of the rotor 200. The magnets 240 may be ferrite magnets which can semi-permanently maintain magnetic properties of high energy density, or magnets including rare earth elements such as neodymium and samarium.

Two magnets 240 abutting each other are disposed such that same polarities face each other. According to the magnetic circuit, a magnetic flux generated by the magnets 240 is concentrated, thus reducing the size of the motor 40 and improving the performance of the motor 40.

Figure 10B:
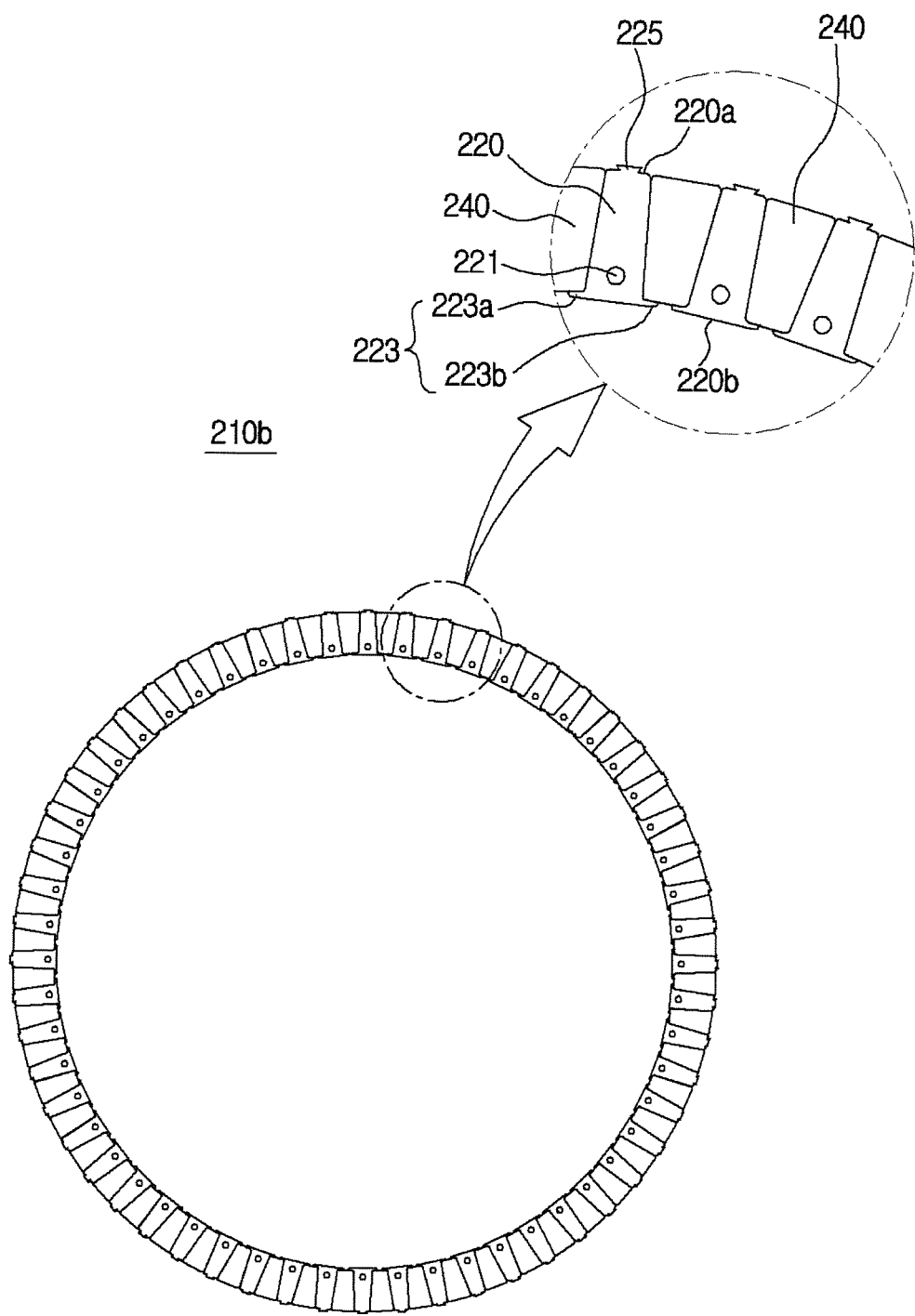
FIG. 10B is a view illustrating a rotor assembly according to another embodiment.

FIG. 10B is a view illustrating a rotor assembly according to another embodiment.

Referring to FIG. 10B, the filling hole 221 and an interference protrusion 225 may be respectively included at both sides of the rotor cores 220. As an example, the filling hole 221 may be formed adjacent to the inner end portion 220*b* of the rotor core 220, and the interference protrusion 225 may be formed at the outer end portion 220*a* of the rotor core 220. An injection molding material may be filled in the filling hole 221 when performing injection molding of the molding unit 260. The filling hole 221 may be the same as or different from the filling hole 221 described with reference to FIG. 10A.

The interference protrusion 225 may protrude from the outer end portion 220*a* of the rotor core 220 in a radial direction of the rotor 200. A diameter of a cross-section of the interference protrusion 225 may become gradually larger as the interference protrusion 225 becomes farther from the outer end portion 220*a* of the rotor core 220. When the rotor assembly 210*b* is inserted and the molding unit 260 is injection molded, the molding unit 260 may be interfered with by the interference protrusion 225.

As the molding unit 260 is injection molded by the injection molding material filled in the filling hole 221 and the molding unit 260 is interfered with by the interference protrusion 225, a fastening strength between the rotor cores 220 and the molding unit 260 may be reinforced.

The first fastening protrusion 223*a* and the second fastening protrusion 223*b* may be formed at the inner end portion 220*b* of the rotor core 220. The first fastening protrusion 223*a* and the second fastening protrusion 223*b* may respectively protrude from both left and right sides of the inner end portion 220*b* of the rotor core 220 in the circumferential direction of the rotor 200. The first fastening protrusion 223*a* may come in contact with the magnet 240 disposed at the left of the rotor core 220 such that the rotor core 220 may be supported toward the center of the rotor 200. The second fastening protrusion 223*b* may come in contact with the magnet 240 disposed at the right of the rotor core 220 such that the rotor core 220 may be supported toward the center of the rotor 200.

Hereinafter, an embodiment of a motor having mounting protrusions such that demagnetization of magnets is prevented when the motor operates will be described with reference to FIGS. 11 to 13.

Figure 11:
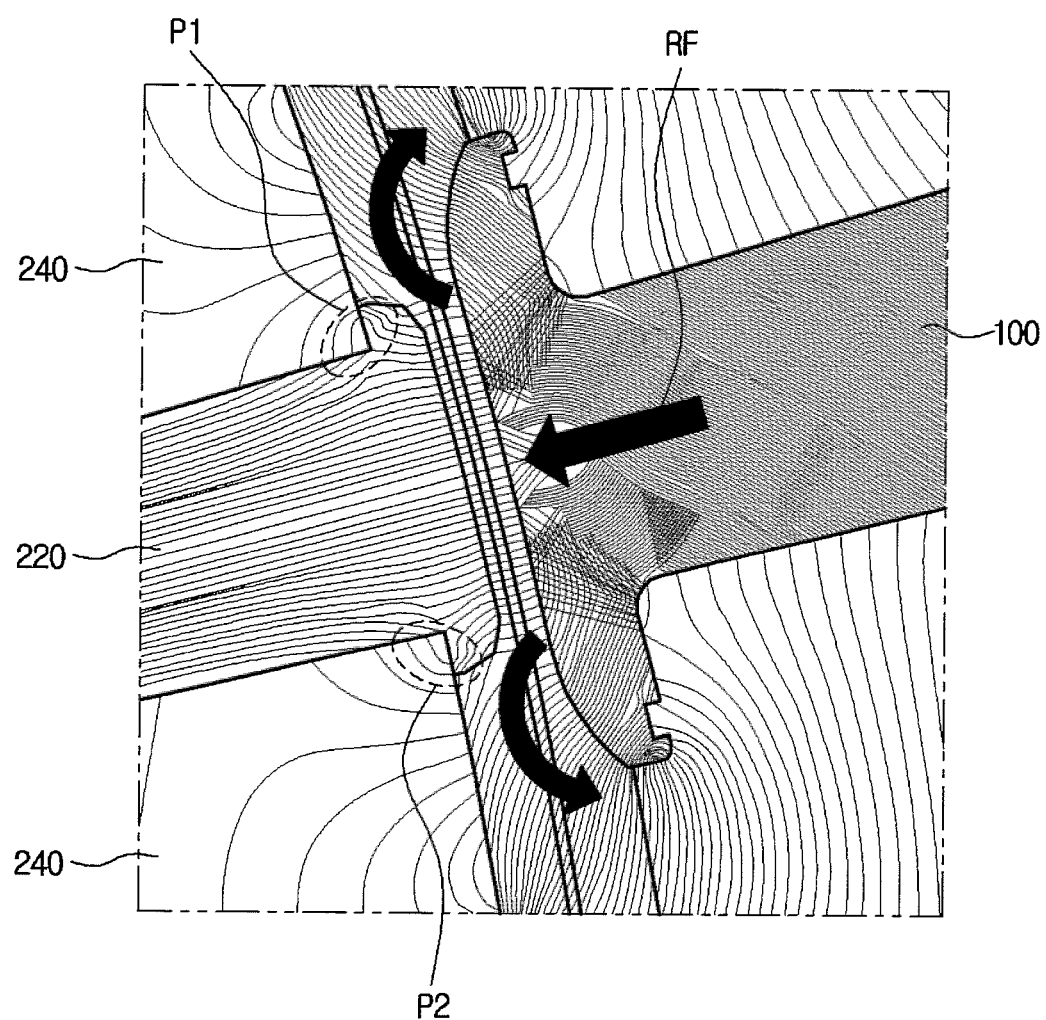
FIG. 11 is a view illustrating a magnetic field formed when a motor without mounting protrusions is operated according to an embodiment.

FIG. 11 illustrates a magnetic field formed when the motor 40 without mounting protrusions 226 operates.

In case of the motor 40 applied to a washing machine, operating power supplied to the coil 120 when the motor 40 initially operates is two or three times greater than driving power due to the load inside the drum 30, the wash water inside the tub 20, and other reasons, and operating current flowing in the coil 120 is two or three times greater than driving current. Due to this reason, a magnetic field (RF) formed due to the operating power supplied to the coil 120 of the stator 100 is about two to three times greater than a magnetic field formed due to the driving power.

In this case, although central portions excluding corners P1 and P2 of the magnets 240 are less affected due to the non-magnetic molding unit 260 provided nearby, both of the corners P1 and P2 of the magnets 240 coming in contact with the rotor core 220 through which a reverse magnetic flux is introduced and discharged are demagnetized and loses magnetic properties of the magnets 240 due to a strong influence of a reverse magnetic field (RF). Accordingly, the magnetic field formed by the magnets 240 become weak, and the attractive force and the repulsive force interacting with the magnetic field formed due to the power supplied to the coil 120 decrease, leading to a decline in an output of the motor 40.

Thus, to prevent the demagnetization, the magnets 240 and the stator 100 may remain a predetermined distance apart from each other. Specifically, the thicknesses of the first fastening protrusion 223*a* and the second fastening protrusion 223*b* may be equal to or greater than a predetermined thickness to maintain the magnets 240 and the stator 100 a predetermined distance apart from each other. Also, the mounting protrusions 226 to be described below may be disposed at the rotor cores 220 to maintain the magnets 240 and the stator 100 a predetermined distance apart from each other.

Figure 12:
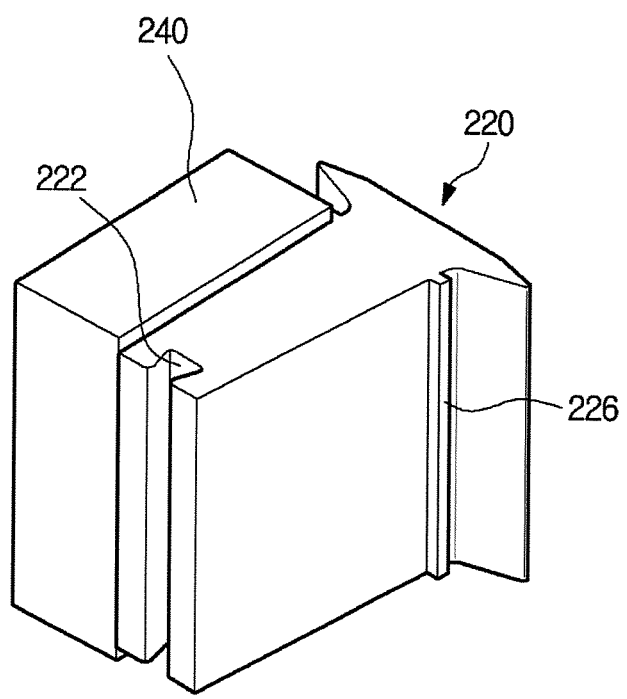
FIG. 12 is a perspective view of a rotor core including mounting protrusions according to another embodiment.

FIG. 12 illustrates an exterior of a rotor core including mounting protrusions.

The mounting protrusions 226 are components to prevent demagnetization of the magnets 240 caused by a strong reverse magnetic field (RF) when the motor 40 operates. The mounting protrusions 226 are disposed at both side surfaces coming in contact with the magnets 240 among surfaces of the rotor cores 220. The mounting protrusions 226 may be disposed a predetermined distance apart from the inner end portions 220*b* or the outer end portions 220*a* such that the magnets 240 remain a predetermined distance apart from the stator 100, and scattering of the magnets 240 may be prevented when the rotor 200 rapidly rotates.

The mounting protrusions 226 may be disposed at sides of the outer end portions 220*a* of the rotor cores 220 as illustrated in FIG. 12 or disposed at sides of the inner end portions 220*b* of the rotor cores 220. Also, the mounting protrusions 226 may be 0.5 mm to 5 mm apart from either the inner end portions 220*b* or the outer end portions 220*a* of the rotor cores 220 which are nearer to the mounting protrusions 226.

In addition, one mounting protrusion 226 may be disposed in a straight line at one surface as illustrated in FIG. 12, or a plurality of mounting protrusions 226 may be provided.

As the mounting protrusions 226 are provided at both side surfaces of the rotor cores 220, demagnetization of the corners of the magnets 240 which occurs due to the operating power being supplied may be reduced, and scattering of the magnets 240 due to the centrifugal force may be decreased when the rotor 200 rapidly rotates. In addition, since the injection molding material is filled between the fastening protrusions 223 and the mounting protrusions 226, a fastening strength between the rotor assembly 210 and the molding unit 260 may be reinforced.

Figure 13:
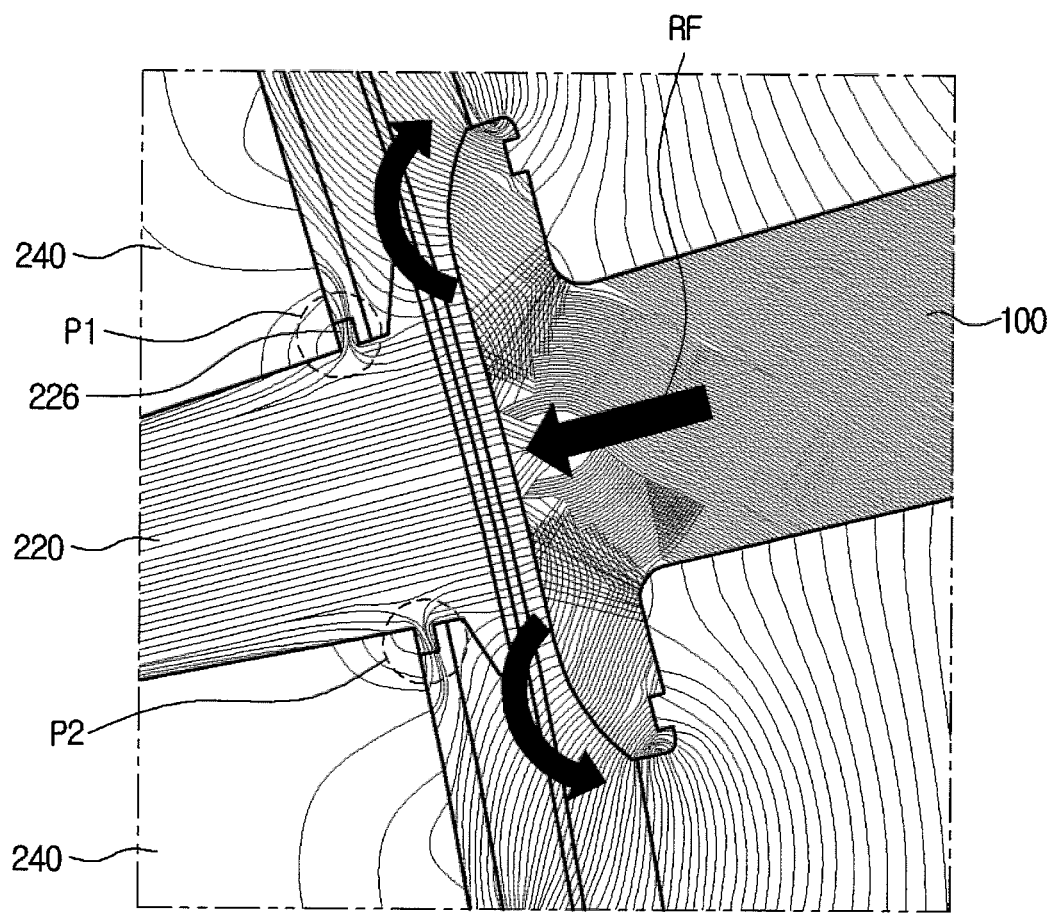
FIG. 13 is a view illustrating a magnetic field formed when a motor including the mounting protrusions is operated according to an embodiment.

FIG. 13 illustrates a magnetic field formed when a motor including mounting protrusions operates.

When the mounting protrusions 226 are disposed at both side surfaces of the rotor cores 220 as illustrated in FIG. 13 to maintain the magnets 240 and the stator 100 to be a predetermined distance apart, an effect of the reverse magnetic field (RF) generated due to the operating power being supplied on the corners P1 and P2 of the magnets 240 is reduced, thus decreasing the demagnetization of the magnets 240. Accordingly, since the magnetic field formed due to the magnets 240 does not decrease and interact with the magnetic field formed due to the power being supplied as the demagnetization of the magnets 240 decreases, the output of the motor 40 may not decrease due to the operating power supply.

Hereinafter, an embodiment of a shape ratio between the rotor cores and the magnets will be described with reference to FIG. 14.

Figure 14:
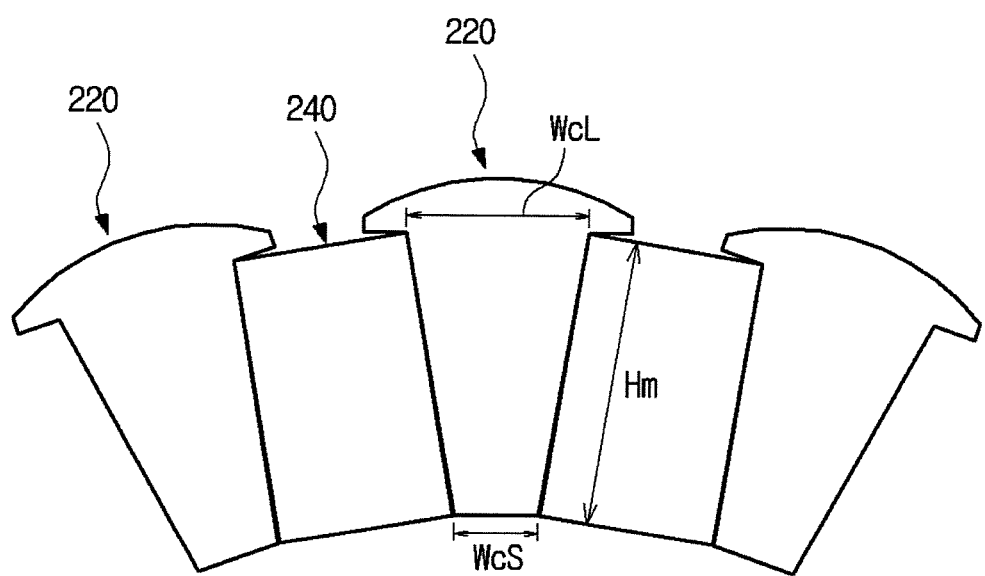
FIG. 14 is a view illustrating concepts for determining a width of the rotor core and a length of a magnet.

FIG. 14 illustrates a concept for determining widths of rotor cores and lengths of magnets.

A magnetization performance of a magnetic flux concentrated type motor may vary due to its structural characteristic of concentrating the magnetic flux of the magnets 240 to the rotor cores 220.

Specifically, magnetization is possible regardless of the shape of the rotor 200 in a magnetizer M of a common PM motor. However, since the magnetic flux is introduced into the rotor cores 220 and has to be discharged to other nearby rotor cores 220 in the magnetic flux concentrated type motor, a magnetization performance is guaranteed only when the shape ratio between the rotor cores 220 and the magnets 240 has a particular ratio.

Here, the shape ratio between the rotor core 220 and the magnet 240 refers to a ratio (Hm/Wc) of length of the magnet 240 from the inner circumference to the outer circumference (Hm) to the circumferential width of the rotor core 220 (Wc).

In addition, in determining whether the shape ratio between the rotor core 220 and the magnet 240 satisfies a particular condition, whether the magnetization of the magnets 240 is performed at only one side of the rotor 200 or performed at both the inner circumferential side and outer circumferential side of the rotor 200 may be an important parameter.

Whether the magnetization of the magnets 240 is performed at only one side may be determined by the capacity of the magnets 240 disposed at the rotor assembly 210, and the capacity of the magnets 240 may be determined by the lengths, widths, and materials of the magnets 240.

Accordingly, to describe the shape ratio required to have a predetermined magnetization performance in the magnetic flux concentrated type motor, a case in which the magnetization is performed at only one side and a case in which the magnetization is performed at both sides will be separately described.

When the magnetization is performed at only one side of the rotor 200, the ratio (Hm/Wc) of the lengths of the magnets 240 (Hm) to the widths of end portions of the rotor cores 220 at the side at which the magnetization is performed (Wc) becomes the shape ratio.

Accordingly, the shape ratio reflecting the widths of the end portions of the rotor cores 220 at the side at which the magnetization is performed has to satisfy a range of particular ratios. Here, the range of the particular ratios may be cases which satisfy shape ratios required to concentrate the magnetic flux at the rotor cores 220 in the magnetic flux concentrated type motor and shape ratios in which the magnetization performance is guaranteed when the magnetic flux is introduced through the magnetizer M. The range of the particular ratios may be determined by a material of the rotor cores 220, an angle between the magnets 240, a material of the magnets 240, and a magnitude of the magnetic flux. Other than the above, various parameters may be used as a parameter which determines the range of the particular ratios.

For example, to guarantee the magnetization performance (e.g. the magnetization uniformity is 0.8 to 1.0) when the magnetic flux is introduced through the magnetizer M, the shape ratio has to be 5.5 or less (Hm/Wc≤5.5). Also, to concentrate the magnetic flux at the rotor cores 220 in the magnetic flux concentrated type motor, the shape ratio has to be 0.5 or greater (0.5≤Hm/Wc). Accordingly, to satisfy both of the cases, the shape ratio between the rotor cores 220 and the magnets 240 has to be in a range of 0.5 to 5.5 (0.5≤Hm/Wc≤5.5).

When the magnetization is performed at both sides of the rotor 200, the ratio (Hm/WcL) of the lengths of the magnets 240 (Hm) to the widths of either the inner end portions 220b or the outer end portions 220a of the rotor cores 220 which have larger widths at the sides at which the magnetization is performed (WcL) becomes the shape ratio.

Accordingly, the shape ratio reflecting the widths of the end portions with larger widths has to satisfy the range of particular ratios. Here, the range of the particular ratios may be cases which satisfy the shape ratios required to concentrate the magnetic flux at the rotor cores 220 in the magnetic flux concentrated type motor and the shape ratios in which the magnetization performance is guaranteed when the magnetic flux is introduced through the magnetizer M. The range of the particular ratios may be determined by the material of the rotor cores 220, the angle between the magnets 240, the material of the magnets 240, and the magnitude of the magnetic flux. Other than the above, various parameters may be used as a parameter which determines the range of the particular ratios.

For example, to guarantee the magnetization performance (e.g. the magnetization uniformity is 0.8 to 1.0) when the magnetic flux is introduced through the magnetizer M, the shape ratio has to be 5.5 or less (Hm/WcL≤5.5). Also, to concentrate the magnetic flux at the rotor cores 220 in the magnetic flux concentrated type motor, the shape ratio has to be 0.5 or greater (0.5≤Hm/WcL). Accordingly, to satisfy both of the cases, the shape ratio between the rotor cores 220 and the magnets 240 has to be in a range of 0.5 to 5.5 (0.5≤Hm/WcL≤5.5).

Hereinafter, embodiments of a rotor assembly will be described with reference to FIGS. 15A to 15P.

Figure 15A:
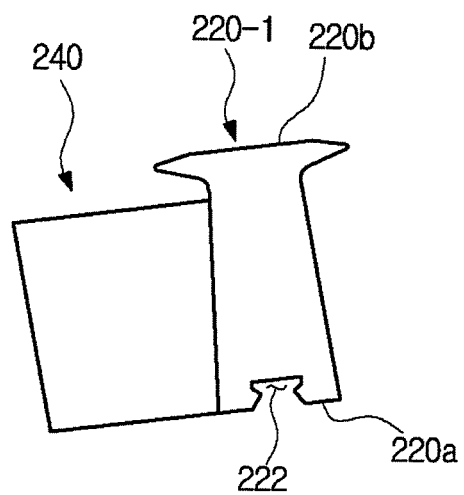
FIGS. 15A to 15P are cross-sectional views of examples of shapes of the rotor core.
Figure 15B:
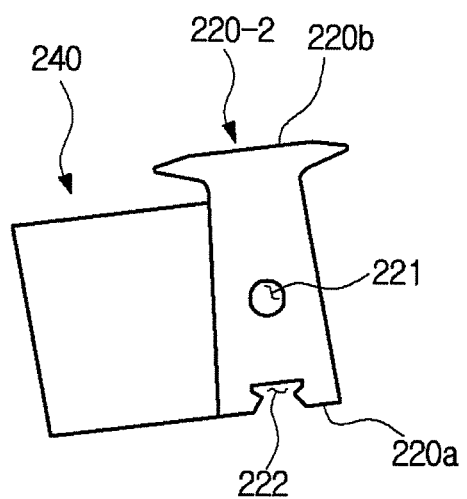
Figure 15C:
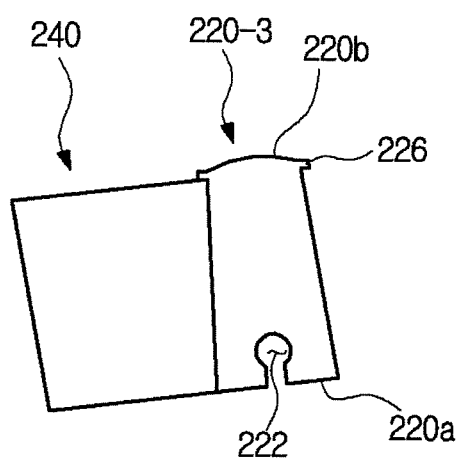
Figure 15D:
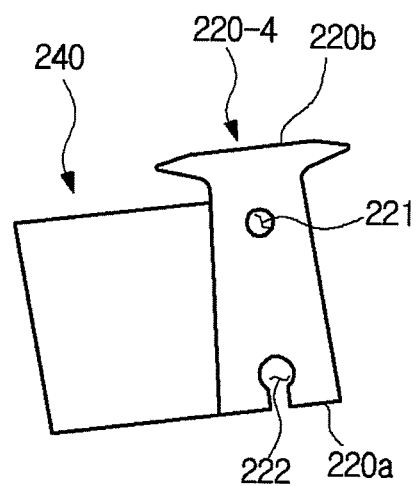
Figure 15E:
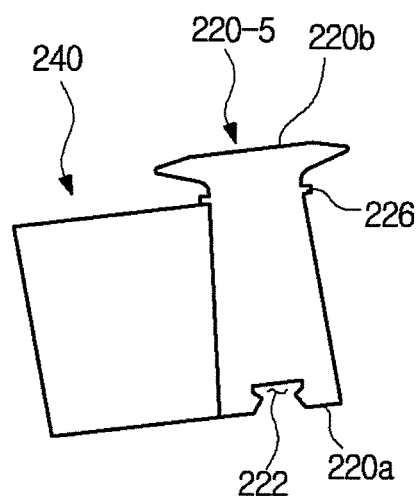
Figure 15F:
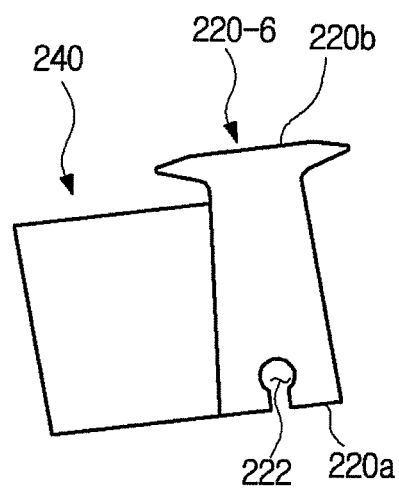
Figure 15G:
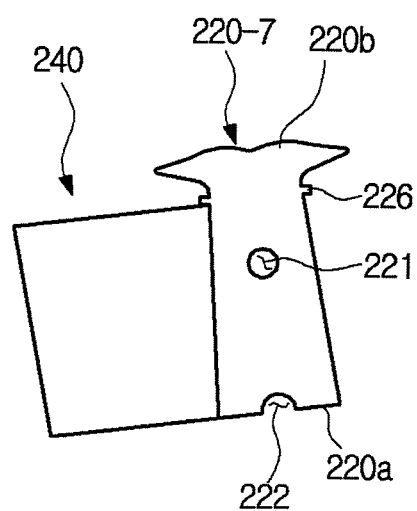
Figure 15H:
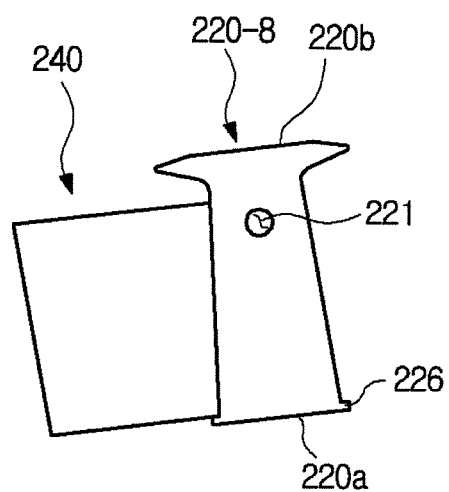
Figure 15I:
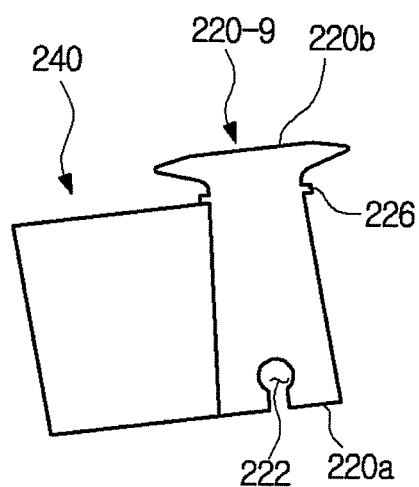
Figure 15J:
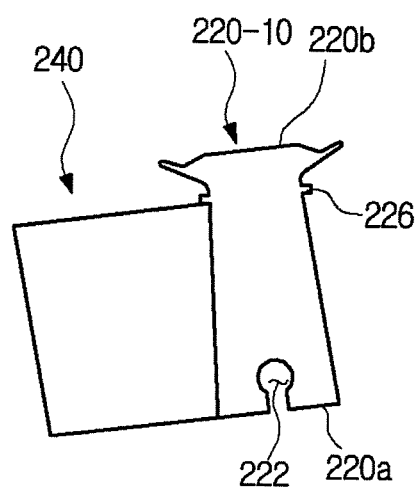
Figure 15K:
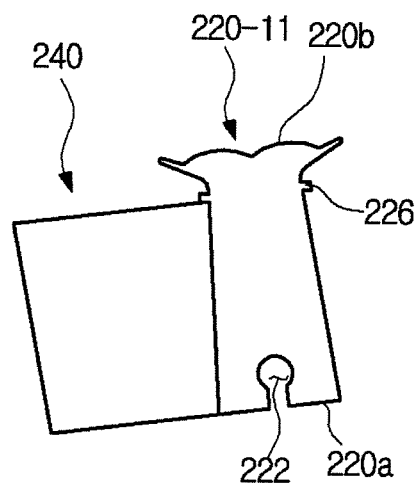
Figure 15L:
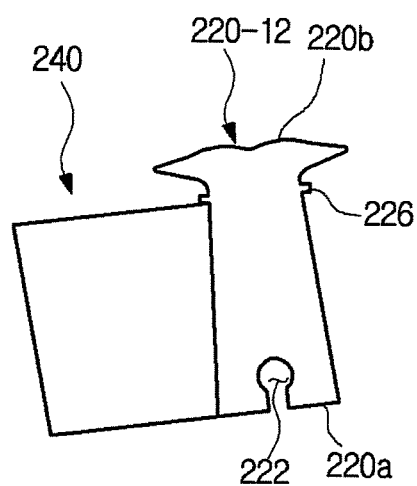
Figure 15M:
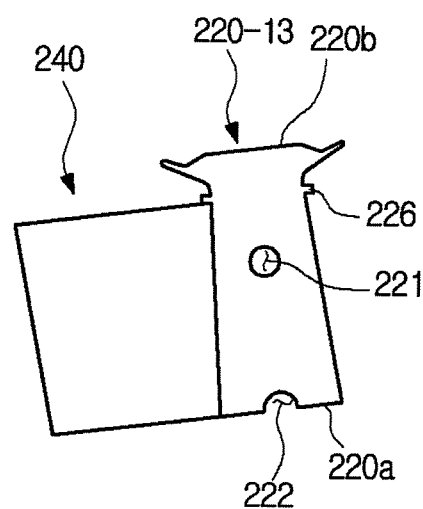
Figure 15N:
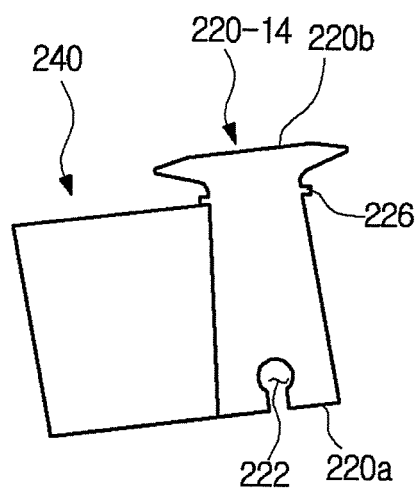
Figure 15O:
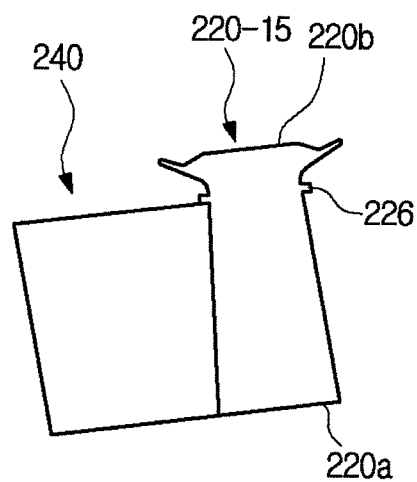
Figure 15P:
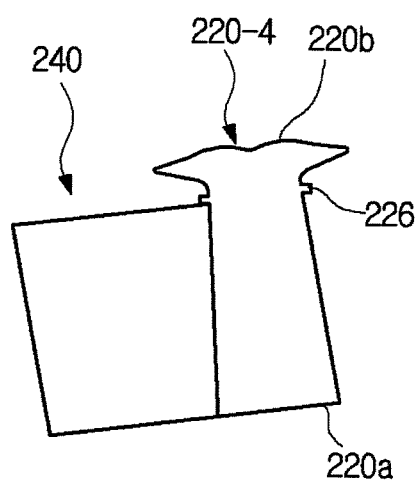

FIGS. 15A to 15P illustrate cross-sectional shapes of rotor cores.

In a rotor core 220-1 illustrated in FIG. 15A, a groove is not disposed at the outer end portion 220a, and the first fastening protrusion 223a and the second fastening protrusion 223b are disposed. Also, the filling groove 222 having a trapezoidal cross-section is disposed at the inner end portion 220b of the rotor core 220-1. Also, the filling hole 221 is not disposed at the center of the rotor core 220-1. Also, the mounting protrusions 226 are not disposed at both side surfaces of the rotor core 220-1.

In a rotor core 220-2 illustrated in FIG. 15B, a groove is not disposed at the outer end portion 220a, and the first fastening protrusion 223a and the second fastening protrusion 223b are disposed. Also, the filling groove 222 having a trapezoidal cross-section is disposed at the inner end portion 220b of the rotor core 220-2. Also, the filling hole 221 of a circular shape is disposed at the center of the inner end portion 220b and the outer end portion 220a at the center of the rotor core 220-2. Also, the mounting protrusions 226 are not disposed at both side surfaces of the rotor core 220-2.

In a rotor core 220-3 illustrated in FIG. 15C, a groove is not disposed at the outer end portion 220a, the first fastening protrusion 223a, and the second fastening protrusion 223b, and the mounting protrusions 226 are disposed. Also, the filling groove 222 having a circular cross-section is disposed at the inner end portion 220b of the rotor core 220-3. Also, the filling hole 221 is not disposed at the center of the rotor core 220-3.

In a rotor core 220-4 illustrated in FIG. 15D, a groove is not disposed at the outer end portion 220a, and the first fastening protrusion 223a and the second fastening protrusion 223b are disposed. Also, the filling groove 222 having a circular cross-section is disposed at the inner end portion 220b of the rotor core 220-4. Also, the filling hole 221 of a circular shape is disposed at a position biased toward the outer end portion 220a at the center of the rotor core 220-4. Also, the mounting protrusions 226 are not disposed at both side surfaces of the rotor core 220-4.

In a rotor core 220-5 illustrated in FIG. 15E, a groove is not disposed at the outer end portion 220a, and the first fastening protrusion 223a and the second fastening protrusion 223b are disposed. Also, the filling groove 222 having a trapezoidal cross-section is disposed at the inner end portion 220b of the rotor core 220-5. Also, the filling hole 221 is not disposed at the center of the rotor core 220-5. Also, the mounting protrusions 226 are disposed at sides of the outer end portion 220a of both side surfaces of the rotor core 220-5.

In a rotor core 220-6 illustrated in FIG. 15F, a groove is not disposed at the outer end portion 220a, and the first fastening protrusion 223a and the second fastening protrusion 223b are disposed. Also, the filling groove 222 having a circular cross-section is disposed at the inner end portion 220b of the rotor core 220-6. Also, the filling hole 221 is not disposed at the center of the rotor core 220-6. Also, the mounting protrusions 226 are not disposed at both side surfaces of the rotor core 220-6.

In a rotor core 220-7 illustrated in FIG. 15G, a groove is disposed at the center of the outer end portion 220a, and the first fastening protrusion 223a and the second fastening protrusion 223b are disposed. Also, the filling groove 222 having an oval cross-section is disposed at the inner end portion 220b of the rotor core 220-7. Also, the filling hole 221 of a circular shape is disposed at the center of the rotor core 220-7. Also, the mounting protrusions 226 are disposed at sides of the outer end portion 220a of both side surfaces of the rotor core 220-7.

In a rotor core 220-8 illustrated in FIG. 15H, a groove is not disposed at the outer end portion 220a, and the first fastening protrusion 223a and the second fastening protrusion 223b are disposed. Also, the filling groove 222 is not disposed at the inner end portion 220b of the rotor core 220-8. Also, the filling hole 221 of a circular shape is disposed at a position biased toward the outer end portion 220a at the center of the rotor core 220-8. Also, the mounting protrusions 226 are disposed at sides of the inner end portion 220b of both side surfaces of the rotor core 220-8.

In a rotor core 220-9 illustrated in FIG. 15I, a groove is not disposed at the outer end portion 220a, and the first fastening protrusion 223a and the second fastening protrusion 223b are disposed. Also, the filling groove 222 having a circular cross-section is disposed at the inner end portion 220b of the rotor core 220-9. Also, the filling hole 221 is not disposed at the center of the rotor core 220-9. Also, the mounting protrusions 226 are disposed at sides of the outer end portion 220a of both side surfaces of the rotor core 220-9.

In a rotor core 220-10 illustrated in FIG. 15J, grooves are disposed at both sides of the outer end portion 220a, and the first fastening protrusion 223a and the second fastening protrusion 223b are disposed. Also, the filling groove 222 having a circular cross-section is disposed at the inner end portion 220b of the rotor core 220-10. Also, the filling hole 221 is not disposed at the center of the rotor core 220-10. Also, the mounting protrusions 226 are disposed at sides of the outer end portion 220a of both side surfaces of the rotor core 220-10.

In a rotor core 220-11 illustrated in FIG. 15K, grooves are disposed at both sides and center of the outer end portion 220a, and the first fastening protrusion 223a and the second fastening protrusion 223b are disposed. Also, the filling groove 222 having a circular cross-section is disposed at the inner end portion 220b of the rotor core 220-11. Also, the filling hole 221 is not disposed at the center of the rotor core 220-11. Also, the mounting protrusions 226 are disposed at sides of the outer end portion 220a of both side surfaces of the rotor core 220-11.

In a rotor core 220-12 illustrated in FIG. 15L, a groove is disposed at the center of the outer end portion 220a, and the first fastening protrusion 223a and the second fastening protrusion 223b are disposed. Also, the filling groove 222 having a circular cross-section is disposed at the inner end portion 220b of the rotor core 220-12. Also, the filling hole 221 is not disposed at the center of the rotor core 220-12. Also, the mounting protrusions 226 are disposed at sides of the outer end portion 220a of both side surfaces of the rotor core 220-12.

In a rotor core 220-13 illustrated in FIG. 15M, grooves are disposed at both sides of the outer end portion 220a, and the first fastening protrusion 223a and the second fastening protrusion 223b are disposed. Also, the filling groove 222 having an oval cross-section is disposed at the inner end portion 220b of the rotor core 220-13. Also, the filling hole 221 of a circular shape is disposed at the center of the rotor core 220-13. Also, the mounting protrusions 226 are disposed at sides of the outer end portion 220a of both side surfaces of the rotor core 220-13.

In a rotor core 220-14 illustrated in FIG. 15N, a groove is not disposed at the outer end portion 220a, and the first fastening protrusion 223a and the second fastening protrusion 223b are disposed. Also, the filling groove 222 having a circular cross-section is disposed at the inner end portion 220b of the rotor core 220-14. Also, the filling hole 221 is not disposed at the center of the rotor core 220-14. Also, the mounting protrusions 226 are disposed at sides of the outer end portion 220a of both side surfaces of the rotor core 220-14.

In a rotor core 220-15 illustrated in FIG. 15O, grooves are disposed at both sides of the outer end portion 220a, and the first fastening protrusion 223a and the second fastening protrusion 223b are disposed. Also, the filling groove 222 is not disposed at the inner end portion 220b of the rotor core 220-15. Also, the filling hole 221 is not disposed at the center of the rotor core 220-15. Also, the mounting protrusions 226 are disposed at sides of the outer end portion 220a of both side surfaces of the rotor core 220-15.

In a rotor core 220-16 illustrated in FIG. 15P, a groove is disposed at the center of the outer end portion 220a, and the first fastening protrusion 223a and the second fastening protrusion 223b are disposed. Also, the filling groove 222 is not disposed at the inner end portion 220b of the rotor core 220-16. Also, the filling hole 221 is not disposed at the center of the rotor core 220-16. Also, the mounting protrusions 226 are disposed at sides of the outer end portion 220a of both side surfaces of the rotor core 220-16.

Hereinafter, an embodiment of first injection molding and magnetization will be described with reference to FIGS. 16 and 17.

Figure 16:
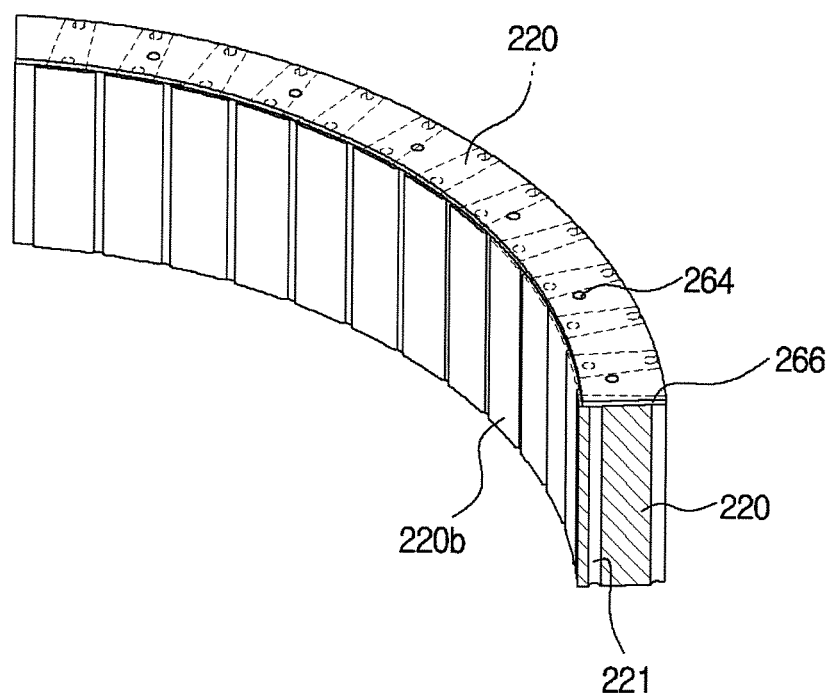
FIG. 16 is a view illustrating a rotor including a firstly injection molded molding unit and a rotor assembly according to an embodiment.

FIG. 16 illustrates a rotor including a firstly injection molded molding unit and a rotor assembly.

The rotor cores 220 and the magnets 240 before magnetization may be alternately disposed to manufacture the rotor 200. When the magnets 240 are magnetized, it is difficult to alternately dispose the rotor cores 220 and the magnets 240 in the process of manufacturing the rotor 200 due to interactions between the magnets 240 by the magnetic field of the magnets 240 or interactions between the magnets 240 and the rotor cores 220. Accordingly, the magnets 240 in unmagnetized states may be alternately disposed with the rotor cores 220.

First injection molding may be performed at the rotor assembly 210 in which the magnets 240 in unmagnetized states and the rotor cores 220 are alternately disposed in order to have the first molding units 266 partially formed. The first molding units 266 may be formed at an upper surface and a lower surface of the rotor assembly 210. Also, the first molding units 266 may be disposed to cover remaining portions after excluding inner surfaces or outer surfaces of the rotor cores 220 of the rotor assembly 210. That is, the first molding units 266 may be disposed at the inner surfaces and the outer surfaces of the rotor assembly 210 at which the magnets 240 are disposed, but the first molding units 266 may not be disposed at the inner surfaces or the outer surfaces of the rotor assembly 210 at which the rotor cores 220 are disposed.

The rotor assembly 210 in which the plurality of magnets 240 and the rotor cores 220 are alternately disposed may be accommodated in the mold, and an injection molding material, which may become the first molding units 266, may be injected into the mold in which the rotor assembly 210 is accommodated. The first injection molding may be partially performed at the rotor assembly 210 while the rotor assembly 210 is inserted as above.

The injection molding material may be inserted into the filling hole 221 disposed at the rotor cores 220 to be injection molded. The injection molding material which is injected through one side of the mold may move to the other side through the filling hole 221. For example, the injection molding material injected through the upper surface of the rotor assembly 210 of the mold may move toward the lower surface of the rotor assembly 210 through the filling hole 221. As injection molding is performed while the injection molding material is inserted into the filling hole 221, the first molding units 266 disposed at the upper portion and the lower portion of the rotor assembly 210 are connected, such that the first molding units 266 and the rotor assembly 210 may be integrally formed. By the above structure, the plurality of rotor cores 220 and the plurality of magnets 240 in the rotor assembly 210 may be fixed by the first molding units 266.

Meanwhile, the thickness of the first molding units 266 may be formed in a range of 1 mm to 5 mm. The thickness of the first molding units 266 disposed at the upper surface of the rotor assembly 210 and the thickness of the first molding units 266 disposed at the lower surface of the rotor assembly 210 may be in the range of 1 mm to 5 mm.

Position determination grooves 264 may be formed at the first molding units 266. When magnetizing the rotor assembly 210, protrusion portions disposed at the magnetizer M may be inserted into the position determination grooves 264 in order to determine a position of the rotor assembly 210 in the magnetizer M. The rotor assembly 210 may be easily disposed in the magnetizer M by the position determination grooves 264. The position determination grooves 264 may also be used during the second injection molding. The rotor assembly 210 may be easily disposed in the mold by the position determination grooves 264 when performing the second injection molding.

The rotor assembly 210 in which the first injection molding is completed may maintain a ring shape, or may be disposed in two or more C-shapes. Specifically, the first molding units 266 may be disposed at the whole rotor assembly 210 disposed in a ring shape such that the ring-shaped rotor assembly 210 and the first molding units 266 may be integrally formed, or the first molding units 266 may be integrally formed with a portion of the rotor assembly 210.

In accordance with the form of the magnetizer M, the ring-shaped rotor assembly 210 and the first molding units 266 may be integrally formed when a large magnetizer M that is capable of magnetizing the whole rotor assembly 210 at one time is disposed, whereas the first molding units 266 may be integrally formed with a portion of the rotor assembly 210 when the rotor assembly 210 needs to be partially magnetized due to the small size of the magnetizer M.

When the ring-shaped rotor assembly 210 and the first molding units 266 are integrally formed, the magnetizer M of large size is required to magnetize the magnets 240, but the magnetization may be promptly performed at one time and the size of the whole rotor 200 may be easily secured.

When the first molding units 266 are integrally formed with a portion of the rotor assembly 210, the magnetization of the magnets 240 may be performed through several times such that the size of the magnetizer M may be reduced and the size of the mold performing the first injection molding may be reduced, thus requiring only low investment costs. In addition, since a separated portion of the rotor assembly 210 is magnetized, a risk of non-magnetization may be reduced.

Figure 17:
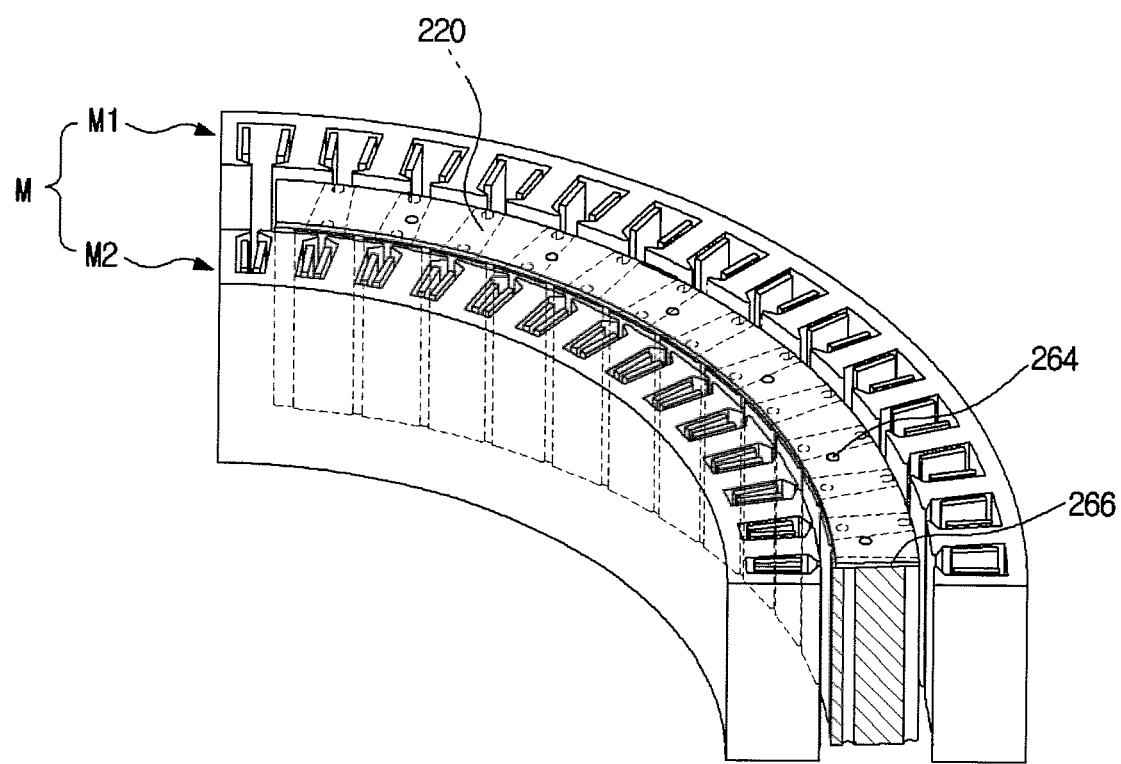
FIG. 17 is a view illustrating a magnetizer which magnetizes a magnet and a rotor before second injection molding according to an embodiment.

FIG. 17 illustrates a magnetizer M magnetizing magnets and a rotor before second injection molding is performed.

The magnetizer M includes an outer magnetizer M1 disposed outside the rotor assembly 210 and an inner magnetizer M2 disposed inside the rotor assembly 210. Since the inner surfaces and the outer surfaces of the rotor assembly 210 are not covered by the first molding units 266 but are exposed, the magnets 240 may be easily magnetized to have the magnetic field of predetermined strength by the magnetizer M. Even if the magnets 240 are covered by the first molding units 266, the magnets 240 may be magnetized through the rotor cores 220.

After the magnets 240 are magnetized by the magnetizer (M), the second injection molding may be performed. After the magnetization of the magnets 240, the rotor assembly 210 may be accommodated in the mold, and the injection molding material may be injected into the mold to be injected molded together with the rotor assembly 210.

Hereinafter, embodiments of the rotor 200 which is secondly injection molded will be described with reference to FIGS. 18 to 20.

Figure 18:
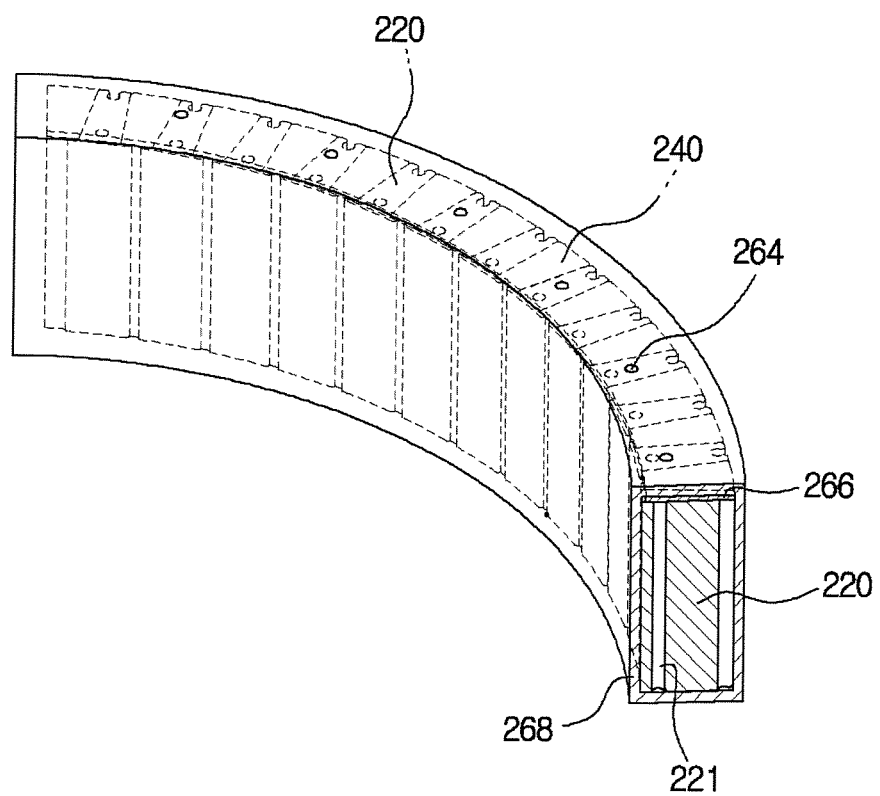
FIG. 18 is a view illustrating a rotor including a secondly injection molded molding unit and the rotor assembly according to an embodiment.

FIG. 18 illustrates a rotor including a secondly injection molded molding unit and a rotor assembly according to an embodiment.

As illustrated in FIG. 18, the outer surfaces of the rotor assembly 210 integrally formed with the first molding units 266 may be injection molded to be surrounded by second molding units 268. When the first molding units 266 are integrally injection molded with a portion of the rotor assembly 210 during the first injection molding, a plurality of rotor assemblies 210 may be injected molded to form one ring shape.

The rotor assembly 210 which is integrally formed with the first molding units 266 and the second molding units 268 may be inserted together with the serration 262 to be injection molded. As the rotor assembly 210 and the serration 262 are inserted together and injection molded, the rotor assembly 210 and the serration 262 may be integrally disposed by the molding unit 260. By this, the rotor 200 may be provided.

In addition, the metal frame 269 connected to the serration 262 may be connected to the rotor assembly 210 by indenting or bending.

Figure 19:
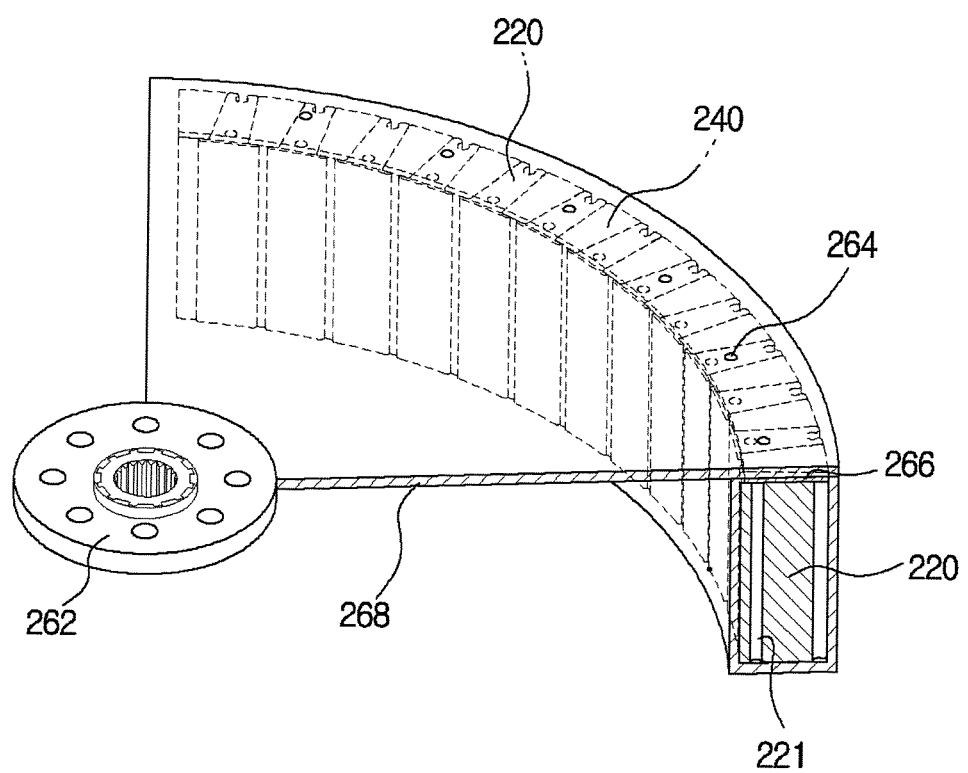
FIG. 19 is a view illustrating a rotor including the secondly injection molded molding unit, the rotor assembly, and a serration according to another embodiment.

FIG. 19 illustrates a rotor including a secondly injection molded molding unit, a rotor assembly, and a serration according to another embodiment.

As illustrated in FIG. 19, the second molding units 268 may be connected to the serration 262 by the second injection molding. The rotor assembly 210 in which the magnetization is completed and the serration 262 may be accommodated in the mold and injection molded after the injection molding material is injected into the mold. By this, the rotor 200 in which the rotor assembly 210 and the serration 262 are provided in the molding unit 260 may be provided. When the first molding units 266 are integrally injection molded with a portion of the rotor assembly 210 during the first injection molding, the plurality of rotor assemblies 210 may be injected molded with the serration 262 to form one ring shape.

When the molding unit 260 is injection molded by the rotor assembly 210 and the serration 262 being inserted as above, the molding unit 260 may be formed to extend a predetermined length toward the outside of the rotor assembly 210. When the rotor 200 rotates, the rotor assembly 210 applies a centrifugal force in the radial direction of the rotor 200. Here, the molding unit 260 disposed outside the rotor assembly 210 continuously receives the force. When a crack occurs as the molding unit 260 disposed outside the rotor assembly 210 receives the force or a portion with low stiffness is present at the molding unit 260, the rotor assembly 210 may be scattered in the radial direction of the rotor 200. By thickening the thickness of the molding unit 260 disposed outside the rotor assembly 210, the above-mentioned scattering of the rotor assembly 210 may be prevented. For example, the thickness of the molding unit 260 may be in a range of 2 mm to 3 mm.

Figure 20:
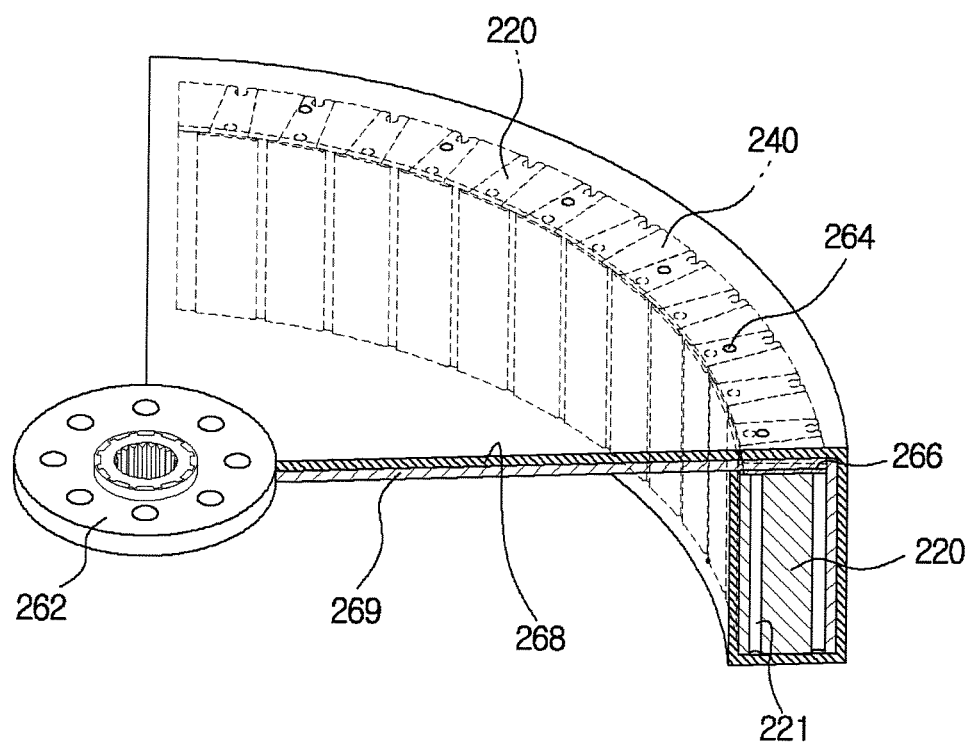
FIG. 20 is a view illustrating a rotor including the secondly injection molded molding unit, the rotor assembly, the serration, and a frame according to still another embodiment.

FIG. 20 illustrates a rotor including a secondly injection molded molding unit, a rotor assembly, a serration, and a frame according to still another embodiment. As illustrated in FIG. 20, the rotor assembly 210 in which the magnetization is completed may be secondly injection molded while being supported by the metal frame 269. The frame 269 may be disposed to support the outer surfaces of the rotor assembly 210. The frame 269 may connect the serration 262 to the rotor assembly 210. The serration 262, the rotor assembly 210, and the frame 269 may be inserted in the mold and integrally injection molded. Since the outside of the rotor assembly 210 is supported by the frame 269, the scattering of the rotor assembly 210 may be prevented even if a portion with low stiffness is present at the molding unit 260.

As described above, the rotor 200 is manufactured by dual injection molding including the first injection molding and the second injection molding, such that the first injection molding is performed to partially cover the rotor assembly 210 in which the plurality of magnets 240 and the plurality of rotor cores 220 are alternately disposed, magnetization is performed afterwards, and the second injection molding is performed to surround the whole rotor assembly 210 after the magnetization, thus being able to easily magnetize the magnets 240 to a desired strength.

Hereinafter, embodiments of a connection between second molding units and a serration will be described with reference to FIGS. 21A and 21B.

Figure 21A:
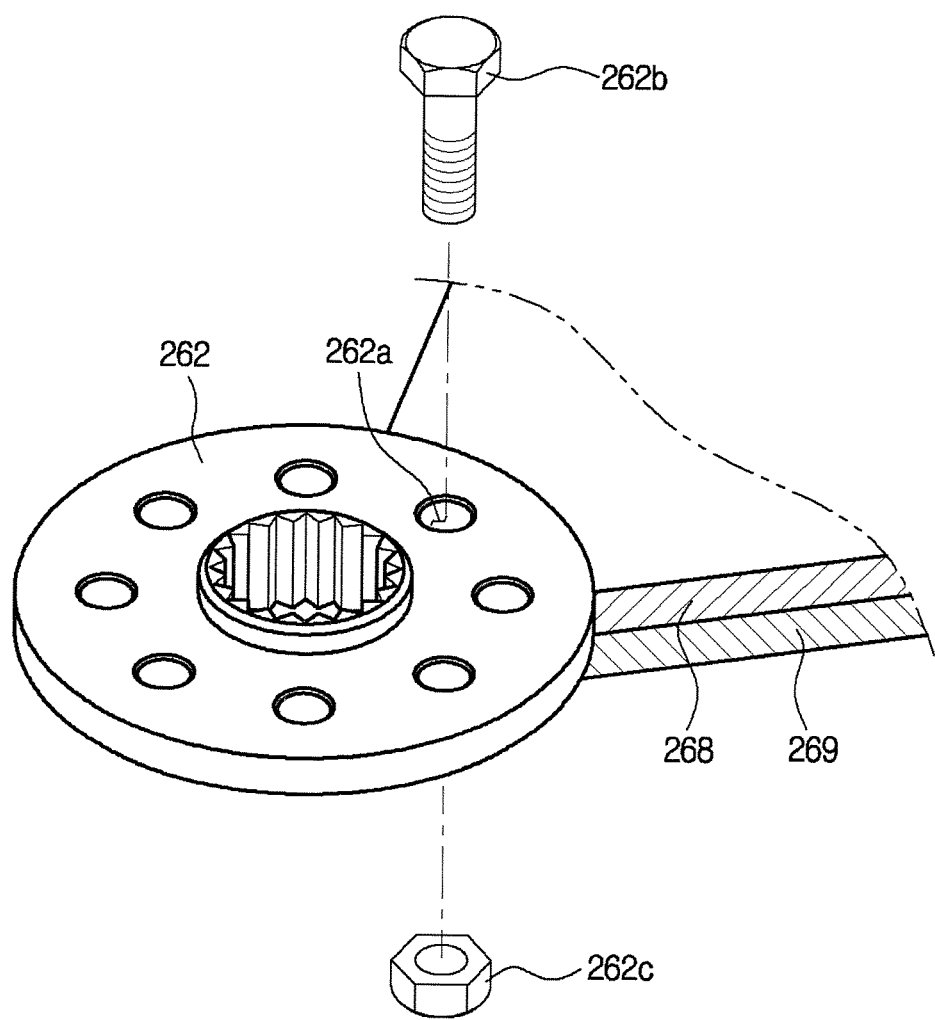
FIG. 21A is a perspective view of the molding unit in which the second molding unit is connected to the serration by insert injection molding according to an embodiment.

FIG. 21A illustrates an exterior of a molding unit in which second molding units are connected to a serration through insert injection molding.

The serration 262 transfers a rotary force generated in the rotor 200 to the driving shaft.

Specifically, the serration 262 has a hole having teeth provided at a central portion of a circular shape and has the driving shaft connected thereto in order to prevent sliding when transferring the rotary force to the driving shaft. Also, a plurality of coupling holes 262a are disposed around the hole at the central portion.

In addition, the serration 262 may include a highly stiff metal material. For example, steel or aluminum (Al) may be used for the frame 269. Other than the above, various highly stiff materials may be used as the material of the frame 269.

The serration 262 and the second molding units 268 are coupled by the insert injection molding. Specifically, the second molding units 268 may be formed after inserting the serration 262 into the mold, filling the injection molding material into the mold, and inserting the injection molding material into the coupling holes 262a. Accordingly, the second molding units 268 may be connected to the serration 262 while the second molding units 268 at upper and lower portions of the coupling holes 262a cover the serration 262.

Figure 21B:
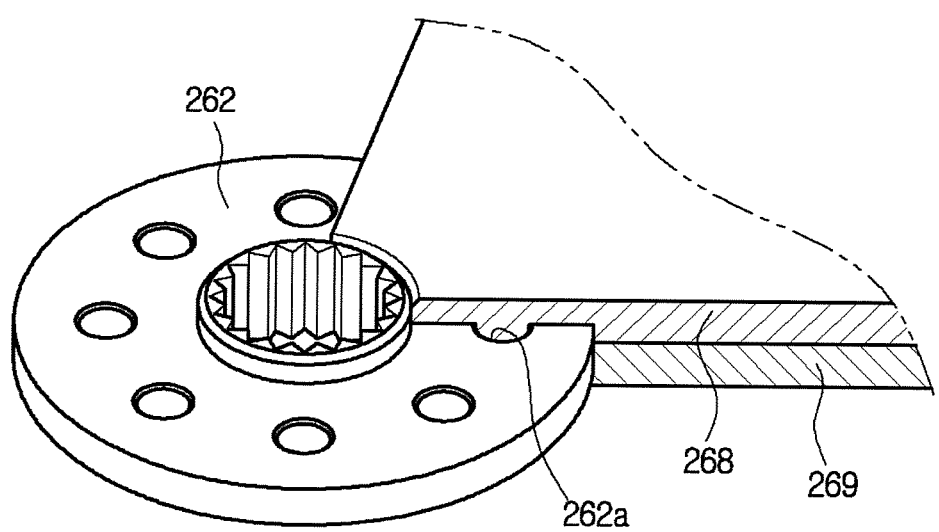
FIG. 21B is a view of the molding unit in which the second molding unit is connected to the serration by a connection member according to another embodiment.

FIG. 21B illustrates an exterior of a molding unit in which second molding units are connected to a serration through a connection member.

As illustrated in FIG. 21B, a hole having teeth is provided at the central portion of the serration 262, and the plurality of coupling holes 262a are disposed around the hole.

The serration 262 in FIG. 21B may be the same as or different from the serration 262 in FIG. 21A.

The second molding units 268 are connected to the frame 269 through the lower surfaces thereof by indenting or bending. The molding unit 260 at which the second molding units 268 are connected to the frame 269 may have holes, coinciding with the coupling holes 262a of the serration 262, formed at an inside connected to the serration 262. The serration 262 and the molding unit 260 are disposed such that the coupling holes 262a of the serration 262 and the holes disposed in the molding unit 260 coincide with each other, and may be connected by the connection member.

Here, the connection member may be an adhesive, or the bolt 262b passing through the hole and the nut 262c fastening the bolt 262b as in FIG. 21A. Other than the above, various connection members may be used to connect the serration 262 to the molding unit 260.

Hereinafter, an embodiment of a frame disposed at an outer circumferential surface of a molding unit will be described with reference to FIGS. 22A and 22B.

Figure 22A:
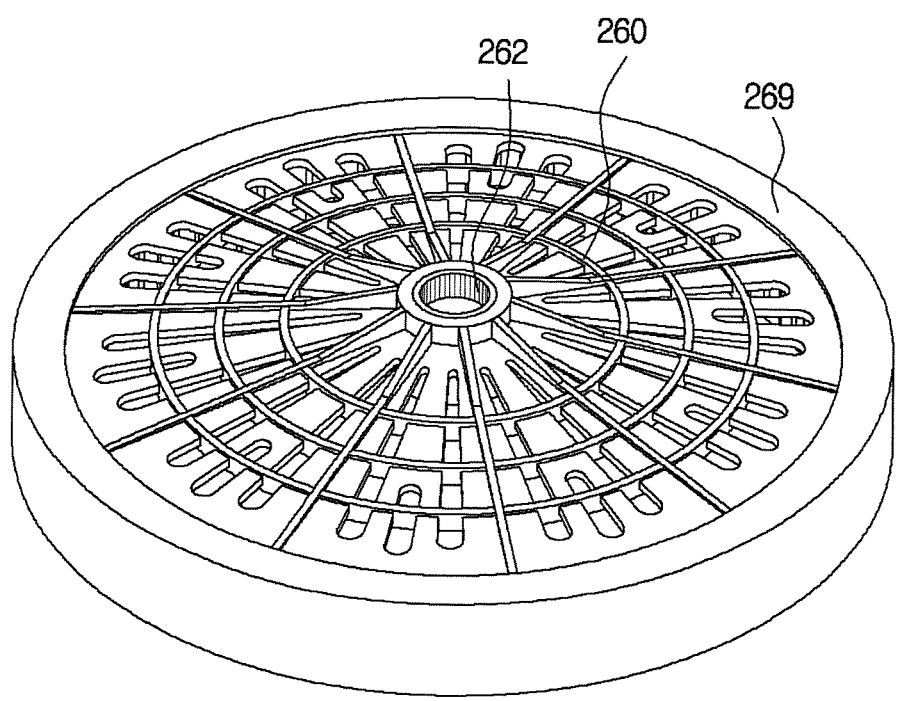
FIG. 22A is a perspective view of the rotor including a frame disposed at an outer circumferential surface of the molding unit according to an embodiment.
Figure 22B:
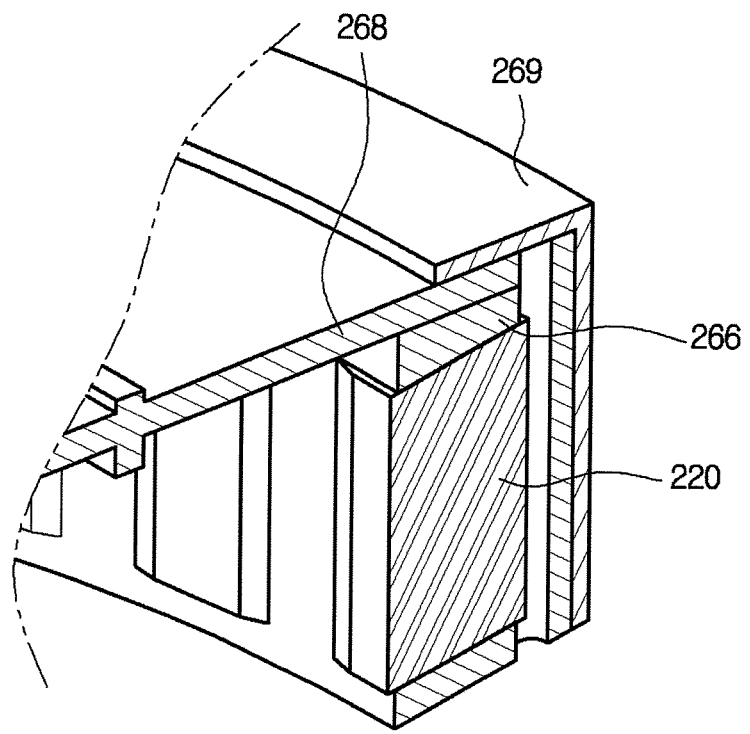
FIG. 22B is an enlarged view of a cross-section of the rotor including the frame disposed at the outer circumferential surface of the molding unit according to an embodiment.

FIG. 22A illustrates an exterior of a rotor including a frame disposed at an outer circumferential surface of a molding unit, and FIG. 22B illustrates an enlarged cross-section of the rotor including the frame disposed at the outer circumferential surface of the molding unit.

The rotor 200 may include the serration 262 to transfer a rotary force to the driving shaft, the molding unit 260 to prevent a leak of a magnetic flux and scattering of the rotor assembly 210, and the frame 269 to prevent scattering of the rotor assembly 210 and the molding unit 260.

The serration 262 and the rotor 200 may be the same as or different from the serration 262 and the rotor 200 according to the first embodiment in FIGS. 2 to 5.

The frame 269 may have a cylindrical shape with open upper and lower surfaces, and include a highly stiff metal material.

The highly stiff metal material may be used as the material of the frame 269 to support the rotor assembly 210 and the molding unit 260 to prevent scattering thereof. For example, steel or aluminum (Al) may be used as the material of the frame 269. Other than the above, various highly stiff materials may be used as the material of the frame 269.

In addition, the frame 269 may include the cylindrical partition formed at a surface adjacent to the outer circumferential surface of the molding unit 260. For example, as illustrated in FIGS. 22A and 22B, the frame 269 may have a cylindrical shape with both open surfaces.

In addition, the frame 269 and the molding unit 260 may be connected by indenting or fastened by coupling through a connection member. Here, the connection member may be the bolt 262b and the nut 262c, or an adhesive. Other than the above, various methods may be used to connect the frame 269 to the molding unit 260.

Hereinafter, a third embodiment of a motor will be described with reference to FIGS. 23 and 24.

Figure 23:
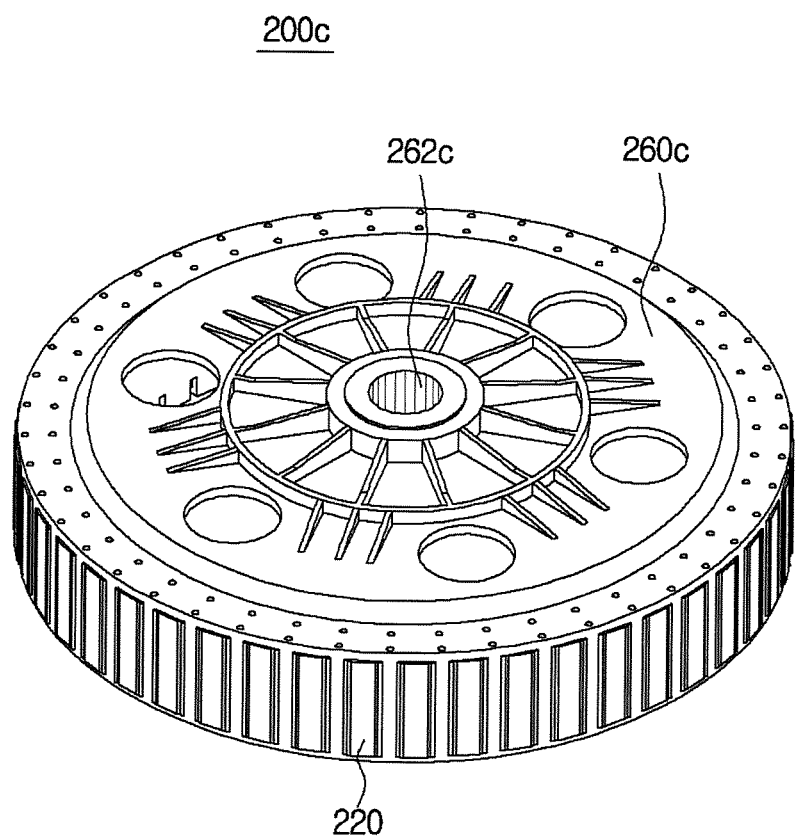
FIG. 23 is a view illustrating a concept of a rotor according to a third embodiment.
Figure 24:
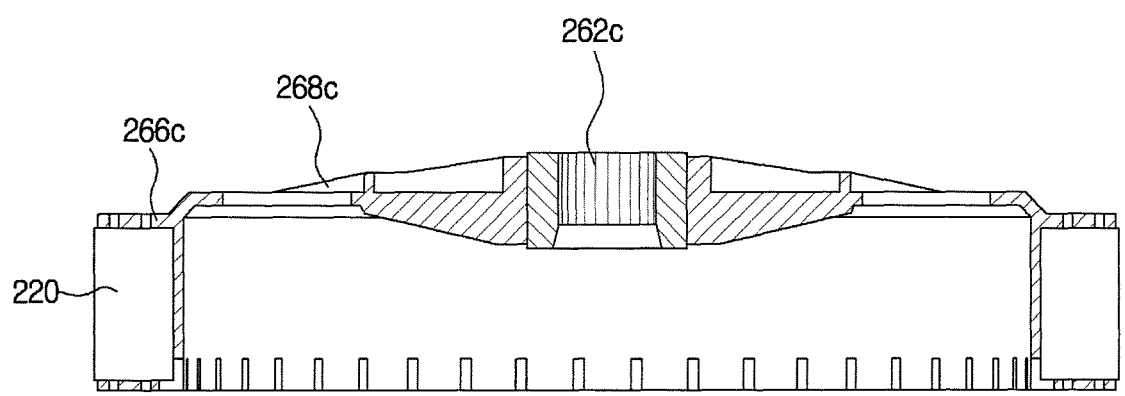
FIG. 24 is a view illustrating a cross-section of the rotor according to the third embodiment.

FIG. 23 illustrates a concept of a rotor, and FIG. 24 illustrates a cross-section of the rotor.

The rotor 200c may include the ring-shaped rotor assembly 210 and a molding unit 260c supporting the rotor assembly 210.

The rotor assembly 210 forms the magnetic field due to the magnets 240, and allows the attractive force and the repulsive force to act with the magnetic field formed due to the power supplied to the coil 120. Also, the rotor assembly 210 has a ring shape.

The rotor assembly 210 may include the rotor cores 220 disposed in a radial shape and the magnets 240 disposed between the rotor cores 220.

The rotor cores 220 and the magnets 240 in the third embodiment may be the same as the rotor cores 220 and the magnets 240 in the first embodiment except directions of the rotor cores 220.

Specifically, the rotor 200a in the first embodiment is an outer type rotor, but the rotor 200c in the third embodiment is an inner type rotor. Accordingly, in the rotor 200c of the third embodiment, the fastening protrusions 223 may be disposed toward the outer circumferential surface, and the filling groove 222 and the interference protrusion 225 may be disposed toward the inner circumferential surface.

The molding unit 260c supports the rotor assembly 210 and transfers the rotary force generated by the rotor assembly 210 to the driving shaft.

Specifically, the molding unit 260c is formed outside the rotor assembly 210 to surround the rotor assembly 210, thus preventing scattering of the rotor assembly 210 including the rotor cores 220 and the magnets 240 therein.

In addition, the molding unit 260c may include the cylindrical partition and the circular partitions coupled to the lower surface of the cylindrical partition formed along the ring-shaped rotor assembly 210. For example, as illustrated in FIGS. 23 and 24, the molding unit 260c may have a cylindrical shape with one open surface.

In addition, the rotor cores 220 may be partially exposed at the surface of the cylindrical partition near the stator 100 to facilitate the interaction with the magnetic field formed at the stator core 130. That is, the rotor cores 220 at the inner circumferential surface of the molding unit 260c may be partially exposed to the outside in the outer type rotor 200c, and the rotor cores 220 at the outer circumferential surface of the molding unit 260c may be partially exposed to the outside in the inner type rotor 200c.

In addition, the rotor cores 220 and the magnets 240 may not be exposed to the outside at the surface of the cylindrical partition not near the stator 100 to prevent the magnetic flux formed by the magnets 240 from leaking in the direction facing the stator 100. That is, the rotor cores 220 and the magnets 240 at the outer circumferential surface of the molding unit 260c may not be exposed to the outside in the outer type rotor 200c, and the rotor cores 220 and the magnets 240 at the inner circumferential surface of the molding unit 260c may not be exposed to the outside in the inner type rotor 200c.

In addition, when magnetization is performed at the inner circumferential surface, the magnetization performance may be degraded due to an absence of a magnetization space caused by the coil 120 of the magnetizer M. Accordingly, to improve the magnetization performance when the magnetization is performed at the inner circumferential surface, an inner circumferential height of the molding unit 260c may be higher than an outer circumferential height thereof as illustrated in FIG. 24. That is, the inner circumferential height may be higher than the height of the rotor assembly 210 such that a space in which the magnetizer M is to be positioned during the magnetization may be provided.

In addition, the molding unit 260c may include first molding units 266c to support the rotor assembly 210 before magnetization, second molding units 268c to support the rotor assembly 210 after the magnetization in order to prevent scattering of the rotor assembly 210, and a serration 262c to transfer the rotary force generated by the rotor 200c to the driving shaft.

In addition, a material of the molding unit 260c may be a non-magnetic material. Specifically, a resin may be used as the material of the molding unit 260c to prevent a magnetic flux from leaking to a side surface facing a side surface adjacent to the rotor 200c. For example, an epoxy resin, urethane resin, polybutyrene terephthalate (PBT) resin, and polyethylene terephthalate (PET) resin may be used as the material of the molding unit 260c. Also, a material of the first molding units 266c and a material of the second molding units 268c may be the same or different from each other. Other than the above, various materials may be used as the material of the molding unit 260c to prevent a leak of the magnetic flux.

In the above, configurations of a rotor according to an embodiment have been described.

Hereinafter, an embodiment of a method of manufacturing a rotor will be described with reference to FIG. 25.

FIG. 25 is a flow chart of a method of manufacturing a rotor.

Rotor cores and magnets in unmagnetized states may be alternately disposed to manufacture a rotor (S1).

Specifically, the rotor cores and the magnets in unmagnetized states are alternately disposed in a rotor assembly. Also, when performing the first injection molding of one rotor assembly, the rotor assembly has a ring shape. When performing the first injection molding of a plurality of rotor assemblies, the rotor assemblies have curved shapes.

In addition, the disposed rotor cores may include a filling hole, an interference protrusion, or both of the filling hole and the interference protrusion.

The first injection molding may be performed at the rotor assembly in which the magnets in unmagnetized states and the rotor cores are alternately disposed in order to have the first molding units partially formed (S2).

Specifically, in accordance with the capacity of the disposed magnets, the rotor assembly is inserted to open only one side of the first molding units in order to perform the first injection molding when magnetization is performed at only one side of the rotor. Conversely, the rotor assembly is inserted to open both sides of the first molding units to perform the first injection molding when magnetization is performed at both sides of the rotor due to great capacity of the disposed magnets. Also, the rotor assembly is inserted such that an outer front surface of the rotor assembly is not opened to perform the first injection molding when magnetization is performed while the entire outer portion of the rotor assembly is covered by the first molding units.

In addition, when the filling hole is disposed at the rotor cores, injection molding materials at upper and lower surfaces of the rotor cores are introduced into the filling hole of the rotor cores when the rotor assembly is inserted to perform the first injection molding, such that the first molding units at the upper and lower surfaces are connected and the mechanical strength may increase.

The rotor assembly integrally disposed with the first molding units may be disposed in the magnetizer in order to perform magnetization of the magnets (S3).

Specifically, in accordance with the capacity of the disposed magnets, the magnetization is performed at only one side of the rotor when the magnets have small capacity, and the magnetization is performed at both sides of the rotor when the magnets have large capacity.

In this case, a magnetic flux may be introduced into a portion of one rotor core exposed to the outside, and the magnetic flux may be discharged to a portion of another rotor core exposed to the outside. In addition, the magnets disposed between the one rotor core and the other rotor core may be magnetized while having polarities along a direction of the magnetic flux.

After the magnets are magnetized by the magnetizer, second injection molding may be formed (S4).

Specifically, the second molding units may be integrally disposed with the serration by insert injection molding, and holes coinciding with the coupling holes in the serration may be formed at the second molding units such that the second molding units and the serration may be connected by the connection member. Also, the second molding units may be disposed to have a cylindrical shape with one open side.

In addition, the second molding units may be disposed to have a cylindrical shape in order to surround the first molding units and the rotor assembly. Also, the second molding units may be secondly injection molded to be connected to the frame by indenting or bending.

In addition, the second molding unit may be manufactured by being divided into a plurality of second molding units to form one rotor, or integrally manufactured as one second molding unit to form one rotor.

The above description is merely an illustrative description of the technical spirit of the present invention, and those of ordinary skill in the art to which the present invention pertains will be able to modify, change, and substitute the present invention in various ways without departing from the essential characteristics of the present invention. Accordingly, the disclosed embodiments and accompanying drawings mentioned above are for describing the technical spirit of the present invention, and the scope of the technical spirit of the present invention is not limited by the embodiments and the drawings. The scope of the present invention should be construed by the claims below, and all technical spirits in a range equivalent to the claims should be construed as belonging to the scope of the present invention.

The invention claimed is:

1. A rotor comprising:
a rotor assembly including magnets and rotor cores, each of the rotor cores comprising an outer end portion;
a first molding unit disposed on an upper surface and a lower surface of the rotor assembly before the magnets are magnetized such that the outer end portion of each of the rotor cores is exposed to an outside of the first molding unit, the first molding unit comprising a molded resin configured to support the rotor assembly; and
a second molding unit disposed to surround both (i) an entirety of the rotor assembly and (ii) an entirety of the first molding unit after the magnets are magnetized, the second molding unit comprising a molded resin configured to support the rotor assembly and the first molding unit.

2. The rotor according to claim 1, wherein the first molding unit is disposed at one portion of the rotor assembly.

3. The rotor according to claim 1, wherein each of the rotor cores further comprises an inner end portion that is exposed to the outside of the first molding unit.

4. The rotor according to claim 1, wherein the first molding unit is disposed to connect the entirety of the rotor assembly disposed in a ring shape.

5. The rotor according to claim 1, wherein a position determination groove is formed at one side surface of the first molding unit.

6. The rotor according to claim 1, wherein a filling hole is formed at the rotor cores such that the first molding unit is disposed at the rotor cores.

7. The rotor according to claim 1, wherein a filling groove is formed at a location of at least one of outer end portions and inner end portions of the rotor cores.

8. The rotor according to claim 1, wherein an interference protrusion is formed at a location of at least one of outer end portions or inner end portions of the rotor cores.

9. The rotor according to claim 1, wherein mounting protrusions are formed on surfaces abutting the magnets of the rotor cores.

10. The rotor according to claim 1, wherein the magnetization of the magnets is performed through one of inner end portions or outer end portions of the rotor cores.

11. The rotor according to claim 10, wherein a ratio (Hm/Wc) of a length of a magnet (Hm) with respect to a width of an end portion (Wc) at which the magnetization of the magnets is performed is in a range of 0.5 to 5.5.

12. The rotor according to claim 1, wherein the magnetization of the magnets is performed through inner end portions and outer end portions of the rotor cores.

13. The rotor according to claim 1, further comprising a serration to which a driving shaft is connected, wherein the second molding unit has the serration inserted thereinto, and wherein the second molding unit is connected to the serration by a connection member.

14. The rotor according to claim 1, further comprising a frame formed of a metal connected to the second molding unit.

15. The rotor according to claim 1, wherein the second molding unit is disposed to support an outer circumferential side of the rotor assembly, and wherein the second molding unit is formed to extend a predetermined length toward the outer circumferential side of the rotor assembly to prevent scattering of the rotor assembly.

16. A rotor comprising:
a rotor assembly including magnets and rotor cores, wherein a magnetization of the magnets is performed through one of an inner end portion and an outer end portion of each of the rotor cores;
a first molding unit disposed on an upper surface or a lower surface of the rotor assembly to support the rotor assembly before the magnets are magnetized such that the outer end portion of each of the rotor cores is exposed to an outside of the first molding unit, the first molding unit comprising a molded resin configured to support the rotor assembly; and a second molding unit disposed to surround both (i) an entirety of the rotor assembly and (ii) an entirety of the first molding unit after the magnets are magnetized, the second molding unit comprising a molded resin configured to support the rotor assembly and the first molding unit.

17. The rotor according to claim 16, wherein the first molding unit is disposed at one portion of the rotor assembly.

18. The rotor according to claim 16, wherein the inner end portion of each of the rotor cores is exposed to an outside of the first molding unit.

19. The rotor according to claim 16, wherein the first molding unit is disposed to connect the whole rotor assembly disposed in a ring shape.

20. The rotor according to claim 16, wherein a ratio (Hm/Wc) of a length of a magnet (Hm) with respect to a width of an end portion (Wc) at which the magnetization of the magnets is performed is in a range of 0.5 to 5.5.

* * * * *